(12) United States Patent
Finlayson et al.

(10) Patent No.: US 7,227,586 B2
(45) Date of Patent: Jun. 5, 2007

(54) COLOR SIGNAL PROCESSING

(75) Inventors: Graham Finlayson, Norfolk (GB); Stephen Hordley, Norwich (GB)

(73) Assignee: University of East Anglia, Norwich, Norfolk (GB)

( * ) Notice: Subject to any disclaimer, the term of this patent is extended or adjusted under 35 U.S.C. 154(b) by 473 days.

(21) Appl. No.: 10/181,089

(22) PCT Filed: Jan. 12, 2001

(86) PCT No.: PCT/GB01/00095

§ 371 (c)(1),
(2), (4) Date: Nov. 27, 2002

(87) PCT Pub. No.: WO01/52557
PCT Pub. Date: Jul. 19, 2001

(65) Prior Publication Data
US 2003/0142222 A1   Jul. 31, 2003

(30) Foreign Application Priority Data
Jan. 12, 2000  (GB) ............................... 0000682.5
Feb. 9, 2000   (GB) ............................... 0002929.5

(51) Int. Cl.
*H04N 9/73* (2006.01)
(52) U.S. Cl. .................... 348/655; 348/603; 348/223.1
(58) Field of Classification Search ............... 348/655, 348/630, 650, 652, 675, 679, 223.1, 225.1, 348/227.1, 603, 621, 627; 358/518, 516, 358/447, 448, 3.27; 382/254, 167
See application file for complete search history.

(56) References Cited

U.S. PATENT DOCUMENTS

| | | | | |
|---|---|---|---|---|
| 4,736,241 A | * | 4/1988 | Murakami et al. | 348/225.1 |
| 5,351,079 A | * | 9/1994 | Usui | 348/223.1 |
| 5,386,496 A | * | 1/1995 | Arai et al. | 706/17 |
| 5,905,543 A | * | 5/1999 | van Trigt | 348/708 |
| 5,907,629 A | * | 5/1999 | Funt et al. | 382/162 |
| 6,038,339 A | * | 3/2000 | Hubel et al. | 382/162 |
| 6,198,553 B1 | * | 3/2001 | Yamamoto et al. | 358/520 |
| 6,933,970 B2 | * | 8/2005 | Koshiba et al. | 348/273 |
| 2003/0020703 A1 | * | 1/2003 | Holub | 345/207 |

* cited by examiner

*Primary Examiner*—David Ometz
*Assistant Examiner*—Jean W. Désir
(74) *Attorney, Agent, or Firm*—Sheridan Ross P.C.

(57) ABSTRACT

A method of adjusting the N components of an N component color signal (such as the 3 components of an RGB color signal) with respect to color temperature of illuminating light when imaging a colored subject, comprising the step of computing the difference between each of the components of the color signal for different temperatures of illuminating light, using an algorithm based on the spectral sensitivity of the imaging means and Planck's equation defining black body illumination to obtain N components whose values are independent of the color temperature of the illuminating light. Normalisation of the adjusted values renders the values independent of intensity of illumination and can also reduce the processing time for further processing of the signals. A technique for compensating for gamma correction which is commonly built in cameras, is disclosed.

28 Claims, 12 Drawing Sheets

Figure 1:
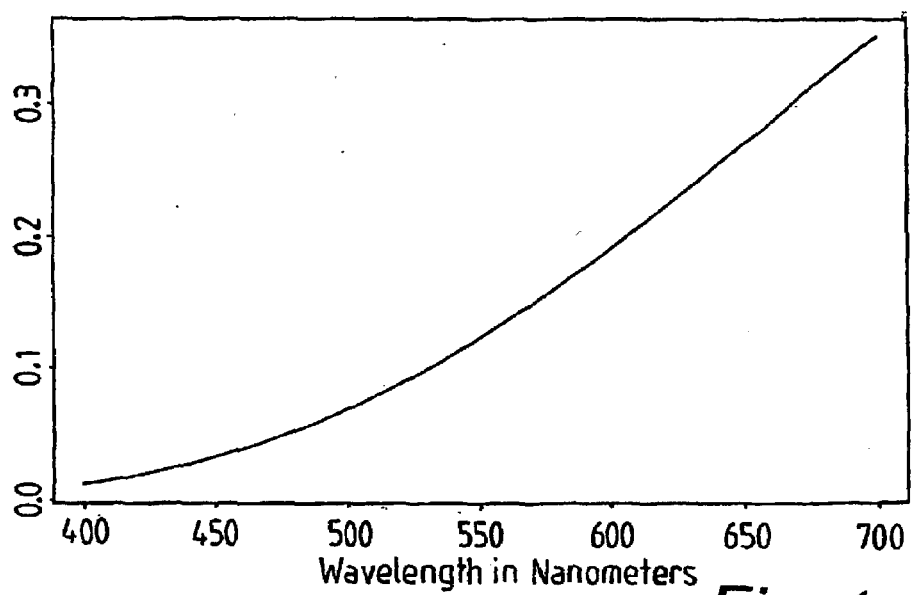

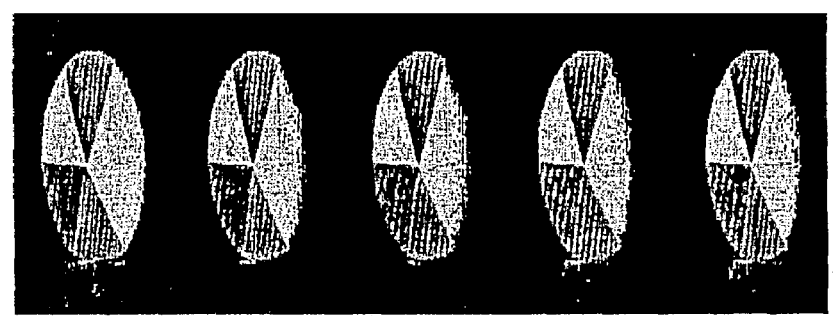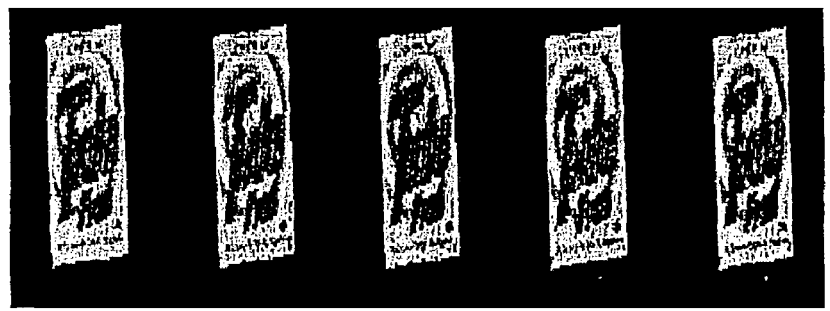
Fig. 15

$$p_k = \int_\omega E(\lambda)S(\lambda)R_k(\lambda)d\lambda \quad (k=R,G,B) \quad (1)$$

$$p_k = \int_\omega E(\lambda)S(\lambda)\delta(\lambda-\lambda_k)d\lambda = E(\lambda_k)S(\lambda_k) \quad (2)$$

$$\begin{bmatrix} E_1(\lambda_R)S(\lambda_R) \\ E_1(\lambda_G)S(\lambda_G) \\ E_1(\lambda_B)S(\lambda_B) \end{bmatrix} = \begin{bmatrix} E_1(\lambda_R)/E_2(\lambda_R) & 0 & 0 \\ 0 & E_1(\lambda_G)/E_2(\lambda_G) & 0 \\ 0 & 0 & E_1(\lambda_B)/E_2(\lambda_B) \end{bmatrix} \begin{bmatrix} E_2(\lambda_R)S(\lambda_R) \\ E_2(\lambda_G)S(\lambda_G) \\ E_2(\lambda_B)S(\lambda_B) \end{bmatrix} \quad (3)$$

$$\begin{bmatrix} p_{r,1} \\ p_{g,1} \\ p_{b,1} \end{bmatrix} = \begin{bmatrix} \alpha & 0 & 0 \\ 0 & \beta & 0 \\ 0 & 0 & \gamma \end{bmatrix} \begin{bmatrix} p_{r,2} \\ p_{g,2} \\ p_{b,2} \end{bmatrix} \quad (4)$$

$$E(\lambda,T) = c_1 \lambda^{-5} \left(e^{\frac{c_2}{\lambda T}} - 1\right)^{-1} \quad (5)$$

Fig. 16

$$E(\lambda, T) = I * c_1 \lambda^{-5} \left(e^{\frac{c_2}{T\lambda}} - 1\right)^{-1} \quad (6)$$

$$\frac{c_2}{T\lambda} = \frac{1.4388 \times 10^{-2}}{x \times 10^{-7} * t * 10^3} = \frac{1.4388 \times 10^2}{x * t} \quad (7)$$

$$E(\lambda, T) \approx I c_1 \lambda^{-5} e^{-\frac{c_2}{T\lambda}} \quad (8)$$

$$p_k = \int_\omega E(\lambda) S(\lambda) \delta(\lambda - \lambda_k) d\lambda = I c_1 \lambda_k^{-5} e^{-\frac{c_2}{T\lambda_k}} S(\lambda_k) \quad (9)$$

$$\ln p_k = \ln I + \ln(S(\lambda_k) \lambda_k^{-5} c_1) - \frac{c_2}{T\lambda_k} \quad (10)$$

$$p'_R = \ln p_R - \ln p_G = S_R - S_G + \frac{1}{T}(E_R - E_G) \quad (11)$$

$$p'_B = \ln p_B - \ln p_G = S_B - S_G + \frac{1}{T}(E_B - E_G) \quad (12)$$

$$p'_R - \frac{(E_R - E_G)}{(E_B - E_G)} p'_B = S_R - S_G - \frac{(E_R - E_G)}{(E_B - E_G)}(S_B - S_G) = f(S_R, S_G, S_B)$$

Fig. 17

$$ax + b(mx+c) = [a \ b] \cdot [x \ (mx+c)] \quad (13)$$

$$\begin{bmatrix} a & b \\ -b & a \end{bmatrix} \begin{bmatrix} x \\ mx+c \end{bmatrix} = \begin{bmatrix} x' \\ y' \end{bmatrix} \quad (14)$$

$$\mu^i = \frac{1}{m} \sum_{k=1}^{m} Q_k^i \quad (15a)$$

$$q_j^i = Q_j^i - \mu^i \quad (15b)$$

$$M = [q_1^1, q_2^1, \ldots, q_m^1, q_1^2, q_2^2, \ldots, q_m^2, \ldots, q_1^n, q_2^n, \ldots, q_m^n] \quad (16)$$

$$\Sigma(M) = \frac{1}{nm} M M^t \quad (17)$$

Fig. 18

$$\text{if } Rq_k^i = \begin{bmatrix} \epsilon \\ x \end{bmatrix} \Rightarrow RQ_k^i = R\underline{\mu}^i + \begin{bmatrix} \epsilon \\ x \end{bmatrix} \quad (18)$$

$$\Sigma(M) = U^t D U \quad (19)$$

$$\Sigma(UM) = D \quad (20)$$

$$E(\lambda) = I_1 c_1 \lambda^{-5} e^{-\frac{c_2}{\lambda T}} + I_2 c_1 \lambda^{-5} e^{-\frac{c_2}{\lambda T}} \quad (21)$$

$$I_3 c_1 \lambda^{-5} e^{-\frac{c_2}{\lambda T}} \neq I_1 c_1 \lambda^{-5} e^{-\frac{c_2}{\lambda T}} + I_2 c_1 \lambda^{-5} e^{-\frac{c_2}{\lambda T}} \quad (22)$$

Fig. 19

COLOR SIGNAL PROCESSING

FIELD OF INVENTION

This invention concerns the processing of colour signals such as RGB signals from a camera or scanner, so as to remove dependency on illuminant colour temperature.

INTRODUCTION

The light reaching the eye is a function of surface reflectance and illuminant colour. Yet, the colours that are perceived depend almost exclusively on surface reflectance; the dependency due to illumrinant colour is removed through colour constancy computation. As an example, the white page of a book looks white whether viewed under blue sky or under artificial light. However, the processes through which colour constancy is attained are not well understood. Indeed, the performance of colour constancy algorithms in computer vision remain quite limited.

The colour constancy problem can be solved if red, green and blue sensor responses, or RGBs, for surfaces seen under an unknown illuminant can be mapped to corresponding RGBs under a known reference light. Despite significant effort, this general 3-dimensional colour constancy problem has yet to be solved. It has been argued that the 3dimensional problem is in fact too difficult to solve: there is an intrinsic ambiguity between the brightness of an illuminant and the lightness of a surface and so dark surfaces viewed under bright lights reflect the same spectral power distribution as highly reflective surfaces under dimmer light. This argument is taken on board in almost all modern colour constancy algorithms; modern algorithms attempt only to recover reference chromaticities.

The chromaticity constancy problem has proven to be much more tractable. In Colour in perspective (IEEE Transactions, pages 1034 to 1038, October 1996), Finlayson made two important observations. First, was that the gamut of possible image chromaticities depended on the illuminant colour (this result follows from previous work on 3-dimensional RGB gamuts) and second, that the illuminant colour was itself quite limited. The chromaticities of real illuminants tend to be tightly clustered around the Planckian locus. In Finlayson's algorithm an image chromaticity is said to be consistent with a particular light if it is within the gamut of all possible chromaticities observable under that light. Usually a single chromaticity will be consistent with many lights; but different chromaticities are consistent with different sets of lights. Intersecting all the illuminant sets results in an overall set of feasible illuminants: illuminants that are consistent with all image chromaticities together and at the same time. Typically, the set of feasible illuminants is quite small and selecting the mean or median illuminant from the feasible set leads to good colour constancy. Unfortunately, when colour diversity is small, the feasible set can be large. In this case it is quite possible that an incorrect illuminant will be selected and when this happens poor colour constancy results.

In more recent work, the ill-posed nature of the colour constancy problem has been tackled using the tool of Bayesian probability theory. Given knowledge of typical scenes it is possible to calculate the probability of observing a particular chromaticity under a particular light. This prior information can then be used to calculate the likelihood of lights given the chromaticities in an image. While this approach delivers much better colour constancy the problem of low colour diversity, though certainly diminished, still remains. For scenes containing small numbers of surfaces (1, 2, 3 or 4) many illuminants can be equally likely.

Whether or not the problem of such low colour diversity is important depends on applications. In digital photography, typical pictures are of colour rich scenes and so the probabilistic approach works well. However, in computer vision interest lies in analysing colour in colour deficient scenes. Beginning with Swain and Ballard (Colour Indexing, International Journal of Computer Vision, 7(11) 11–32, 1991), many authors have attempted to use the distribution of colours or chromaticities in an image as a cue to image content in general and object recognition in particular. This idea works well when lighting colour is held fixed but can fail spectacularly when illumination is allowed to vary. Swain conjectured that colour constancy preprocessing would solve the varying illumination problem. Unfortunately, because the objects to be recognised sometimes have low colour diversity—many branded products, such as Campbell's soup (used in Swain's original experiments), have just 1 or 2 colours—the colour constancy problem is not easy to solve. Indeed, Funt et al (Is machine colour constancy good enough? Fifth European Conference on Computer Vision (Vol. II), pages 445–459) tested a variety of chromaticity constancy algorithms and conlcuded that none of them rendered chromaticity a stable enough cue for recognition.

The failure of the colour constancy preprocessing in object recognition has inspired the colour invariant approach. Colour invariants are generally functions of several image colours designed so that terms dependent on illumination cancel. As an example, if $(r_1, g_1, b_1)$ and $(r_2, g_2, b_2)$ denote camera responses corresponding to two scene points viewed under one colour of light then $(\alpha r_1, \beta g_1, \gamma b_1)$ and $(\alpha r_2, \beta g_2, \gamma b_2)$ denote the responses induced by the same points viewed under a different colour of light (assuming the camera sensors are sufficiently marrow-band). Clearly, it is easy to derive algebraic expressions where $\alpha$, $\beta$ and $\gamma$ (and so illumination) cancel:

$$\left(\frac{r1}{r2}, \frac{g1}{g2}, \frac{b1}{b2}\right).$$

Indexing on colour-ratios (and other invariants), have been shown to deliver illuminant independent object recognition. Yet, this approach suffers from three intrinsic problems. First, because spatial context is used, invariant computation is sensitive to occlusion. Second, invariants can only be calculated assuming there are two or more colours adjacent to one another (not always true). Third, invariants can be calculated post-colour constancy computation but the converse is not true: colour constancy adds more information if it can be computed. To understand this last case, consider an image taken under an unknown illumination. A perfect colour constancy algorithm can, by definition, map image colours to corresponding colours under the reference light: it is possible then to calculate the full 3-dimensional absolute colour at each point in an image. In contrast, colour invariants cancel out variation due to illumination by exploiting spatial context e.g. under fairly reasonable conditions the ratio of adjacent RGBs is illuminant independent, The result is that absolute colour information is confounded: the colour of a pixel can only be known relative to the neighbourhood of the calculated invariant. Clearly, one might calculate relative information given absolute values (i.e. given the output of a colour constancy algorithm) but wthe converse is not true. It is in this sense that colour constancy computation delivers more information.

BACKGROUND OF THE INVENTION

The foregoing can be summarised as follows:

The image formed by light reflected from an object inter alia depends upon two factors: (a) the intensity of illumination incident upon the object (and hence the intensity of reflected light), and (b) the wavelength(s) of illumination incident upon the object, (more usually identified as the "colour temperature" (T) of the illumination). Factor (b) determines the wavelengths of the reflected light, and therefore the colours in the image formed, while factor (a) determines the brightness of the image.

Clearly therefore, the same object may form different images when viewed by cameras or other image-forming devices, under different intensities, and/or wavelengths of illumination. In the case of daylight these factors (a) and (b) will tend to alter, for example, with the time of day, or season. If artificial light is employed, even greater variations can arise. This represents a problem for any object and/or image analysing and/or recognition system which relies on processing colour signals for analysis from a camera such as the RGB signals from a three sensor camera.

It is possible to allow for variations in intensity of illumination, and various techniques are known and described in the art. As is well known colour can be described mathematically by a three component vector R, G, B. The output of a three sensor camera viewing an object provides these three components, the magnitude of each of which is indicative of the quantity of light reflected by the object at the red, green and blue wavelengths.

Although the nomenclature suggests single wavelength resolution, in fact most camera sensors are responsive to a broad band of wavelengths in each of the red, green and blue regions of the visible spectrum, and such sensors are referred to as broad band sensors. However, cameras have been developed with a very limited response band width to wavelengths in the red, green and blue regions of the spectrum, by utilising in such cameras narrow band sensors, i.e. sensors that only respond to a narrow band of wavelengths in each of three regions of the spectrum.

Under different intensities of light the RGB signal varies in magnitude. Thus if the intensity scales by a factor k, then the camera signal equals (kR, kG, kB). By normalising the RGB vector in relation to intensity, the dependency due to intensity (k), can be removed.

Various techniques exist in the literature for removing k. For instance one may divide the RGB vector by (R+G+B). This results in chromaticity normalisation. Equally, one may divide by the square root of the sum of the squares of the RGB signal i.e. $(R^2+G^2+B^2)$. If R+G+B=1, then B=1−(R+G) (i.e. given R and G it is possible to calculate B, so the third parameter can be written in terms of the other two parameters). In general, any magnitude normalised RGB vector can be encoded by two parameters.

Whilst various such methods are able to remove variations in an image arising from fluctuations in intensity of illumination, it has not generally been possible to correct for variations in colour temperature of the illumination.

One object of the present invention is to provide a method to provide for such colour temperature correction.

It is a further object of the present invention to bridge the gap between the classical colour constancy computation and the invariant approach referred to in the Introduction section.

The invention has an additional object to provide a method of producing from colour corrected (and preferably also intensity corrected) colour image signals, signals which will produce a grey scale image which is substantially the same in terms of grey scale and brightness irrespective of the illumination of the original object producing the image.

SUMMARY OF THE INVENTION

The invention lies in a method of adjusting the N components of an N component colour signal (such as the 3 components of an RGB colour signal) so as to produce component values which are independent of the colour temperature of the illuminating light comprising the step of computing for each component a new value using the original component value and one other component value and an algorithm incorporating a mathematical operator whose value is related to the spectral sensitivity of the imaging means to different colour temperature illuminants.

The invention also lies in a method of processing component signals making up an N component colour signal (such as RGB signals of a 3 component colour signal) defining an image of an illuminated coloured subject to produce modified signal components defining an image of the same subject as if illuminated under light of a different colour temperature, comprising the steps of:

1) generating the N-(RGB etc.) components of a colour signal corresponding to an illumination of the subject using illumination of colour temperature $T_1$;
2) forming the N log values (R' G' B' etc.) of the N-RGB etc. components of the colour signal so obtained; and
3) computing the N log values (R*, G*, B* etc.) of the N-RGB etc. components of the colour signal for a different illumination colour temperature $T_2$ using the equation:

$$(R*G*B* \ldots) = (R'G'B' \ldots) + X(u, v, w, \ldots)$$

where X is proportional to (T1–T2) and u, v, w etc. are constants that depend only on the spectral sensitivities of the signal source and Planck's equation defining black body illumination; and 4) processing and/or storing and/or controlling a display device using the N-(R*, G*, B*, ...) values or signals derived therefrom, or converting the N log values (R*, G*, B*, ...) to appropriate N-RGB etc. values for processing and/or display and/or storing.

Considering the simple 3-component RGB case, and taking X into the brackets reduces to:

$$(R*, G*, B*) = (R', G', B') + (Xu, Xv, Xw)$$

Further simplification:

$$(R*, G*, B*) = (R'+Xu, G'+Xv, B'+Xw)$$

The above equation is really a way of writing three separate equations:

$$R* = R' + Xu \quad (a)$$

$$G* = G' + Xv \quad (b)$$

$$B* = B' + Xw \quad (c)$$

Since X is constant for all three (a) to (c), Xv in (b) can be converted to Xu by dividing (b) by v and multiplying by u throughout. The Xu expression (which is the only temperature dependent element in (b) and (a) can be eliminated by subtracting $\frac{u}{v}(b)$ from both sides of
(a) giving on one side $\left(R^* - \frac{u}{v}G^*\right)$ and on the other side $(R' + Xu) - \frac{u}{v} \cdot (G' + Xv)$ (R'+Xu)−u(G'+Xv)/v.

The right hand side can be re-written as:

$(R'+Xu)-uG'/v-uXv/v$ and this reduces to:

$R'+Xu-uG'/v-Xu$ which equals (R'−uG'/v)

ie $R^* - \frac{u}{v}G^* = R' + \frac{u}{v}G'$.

In a similar way $B^* - \frac{w}{v}G^*$ can be shown to equal $B' - \frac{w}{v}G'$.

In the same way, by taking G*/v inside the brackets; we can re-write (R*, G*, B*)−G*/v(u,v,w), as $(R^*,G^*,B^*)-(uG^*/v,vG^*/v,wG^*/v)$ Simplifying again:

$\left(R^* - \frac{u}{v}G^*\right), \left(G^* - \frac{v}{v}G^*\right), \left(B^* - \frac{w}{v}G^*\right)$ and this equals:

$\left(R^* - \frac{u}{v}G^*\right), 0, \left(B^* - \frac{w}{v}G^*\right)$

Previously, it has been shown that $R^* - \frac{u}{v}G^*$ and $B^* - \frac{w}{v}G^*$ are independent of X and hence temperature. So, (R*, G*, B*)−G*/v(u, v, w)=(x, O, y) (where x and y denote illuminant independent quantities), or (R*, G*, B*)−R*/u(u, v, w)=(O, x, y), by analogy to the arguments set forth above.

Values for the parameters u, v and w, of, for example, a colour camera or scanner may be obtained using the following method. Under a first illuminant (say tungsten), take a picture of a uniform colour patch. Denote the log of the RGB components as (R'$_1$, G'$_1$, B'$_1$). Now change the illuminant (say to daylight) and obtain a second RGB signal and convert to log values (R'$_2$, G'$_2$, B'$_2$) again for the RGB due to the second illuminant.

From the foregoing and relying on Planck's theory, the log RGB values under lights 1 and 2 are related as follows:

$(R'_1,G'_1,B'_1)=(R'_2,G'_2,B'_2)+X(u,v,w)$

Without loss of generality, we can set X=1. We can do this because X is simply a scalar value which disappears (is factored out) if the RGB signal values are expressed in a manner which is independent of colour temperature. Under this assumption:

$u=R'_1-R'_2, v=G'_1-G'_2, w=B'_1-B'_2$

In practice a preferred extension is to select values for u, v, and w based on a number of different observations of the same surface under different lights and of other coloured surfaces under similar different illuminants (lights). This can be done statistically and optimised, as will be described later.

The variable T presented in the text refers to colour temperature. For typical illuminants, T will be in the range 2000K (orangish light) to 10000K (bluish light). 5000K correlates with whitish light.

The colour signal to be processed may be obtained from a camera, a multispectral imaging device, or a scanner, or may be a computer generated RGB etc. signal.

The method is typically applied to the colour component values of each pixel making up a multi-pixel image.

In the case of a 3 component RGB signal, the RGB vectors can be described in terms of their orientation with respect to three orthogonal R, G and B axes. For any vector, its orientation will define the resulting colour produced by the signals. Two orientations (or angles) suffice to describe a three-dimensional vector (irrespective of its magnitude).

When applied to an image containing a large number of pixels the time required for adjustment and processing can be reduced and the signal rendered intensity independent by normalising the RGB etc. values with respect to one of the values—e.g. with respect to the G value), in that for example (R/G, 1, B/G) can be written as (R/G, B/G), in the case of a 3 component RGB signal.

In accordance with the invention the mathematical operator employed to reduce the number of components from say 3 to 2, is independent of the colour temperature T of the illumination.

The invention allows the log value R*, G*, B* of each of the components of a 3-component RGB signal to be represented by three log values: (R*−uG*/v, (B*−wg*/v) and a third term which will always be zero; the two non-zero values being independent of the illumination colour temperature.

The invention also allows these three log values to be expressed as a three-value vector (R*, G*, B*)−G*/v (u, v, w) which can be written in the form (x, 0, y), where again the x and y components are independent of the colour temperature of light illuminating (or deemed to be illuminating) a subject from which the colour signal is obtained.

In each case the co-ordinates or vector components are two numbers that are independent of the temperature of the illuminant, and in each case normalising is achieved in accordance with the invention by using algebra to find expressions which cancel out T and do not rely on the value of X.

The invention also provides a method of processing the N component signals making up a colour signal (such as RGB signals of a 3 component colour signal) defining an image of an illuminated coloured subject to produce modified signal components defining an image of the same subject as if illuminated under light of a different colour temperture (T), comprising the steps of:

(1) normalising the N components of the colour signal with respect to one of the components (e.g. G) to provide (N−1) co-ordinates (e.g. R/G, B/G in a 3 component RGB signal) which are independent of the illumination intensity, (2) computing the log values of these (N−1) co-ordinates, (such that log(R/G)=R' and log (B/G)=B' in the case of an RGB signal), (3) adjusting the values of (R', B', etc.) to produce new values (R*, B*, etc. ) corresponding to the values which would apply if the colour temperature of the illumination is $T_2$ using the equation (R*, B*, etc.)=(R', B', etc.)+X(a, b, etc.) where X is proportional to $(T_1-T_2)$ and a and b etc. are constants that depend only on the spectral sensitivities of the source and Planck's equation defining black-body illumination; and (4) converting the values (R*, B*, etc.) to new (RGB etc. ) values for processing and/or display.

In accordance with the invention a reduction in the number of values to be processed for rendering purposes is achieved by mathematically normalising the expression (R', B', etc.)+X(a, b, etc.) so as to be independent of the variable T.

In the case of a 3 component RGB signal, one such mathematical normalisation results in the expression being reduced to the co-ordinate (R*−aB*/b), which is independent of colour temperature.

As a result of an alternative normalisation, in the case of an RGB signal, the expression can be reduced to the vector (R*, B*)−B*/b(a, b) which is also illuminant invariant.

In this latter case the co-ordinates are in the form (x, 0), indicating that with appropriate normalisation, a colour signal can be reduced to a single number x that is independent of the colour temperature T of the illumination.

Any algebraic operation of (R', B') that removes dependency on T is a colour temperature normalisation, and is within the scope of this invention.

It is a feature of the invention that all temperature normalised co-ordinates (derived by any algebraic argument) can be transformed into one another.

If the source has Delta function sensitivities and can therefore be thought of as having narrow-band sensors, then (a, b) can be found analytically (they follow from Planck" equation). For wide-band sensor sources (a, b) can be found experimentally.

As a precursor to any method involving the processing methods described above, it is of course necessary to calibrate the source in advance and determine the (a, b) values for the source.

The invention thus lies in a method of processing a colour signal from a colour signal source so as to eliminate dependency on colour temperature and/or intensity variation by using a mathematical algorithm derived from the source sensitivities to different wavelengths of light, in a signal processing computer supplied with the colour signal, to provide new (corrected) values for the component making up the colour signal which are independent of the colour temperature of the light illuminating (or deemed to illuminate) the subject described by the colour signals.

The invention also lies in a computer when programmed so as to process RGB signals from a colour signal source so as to produce illumination colour temperature and/or intensity corrected signals from the three RGB signals, to form an illumination colour and/or intensity corrected RGB signal for image processing and/or for display and/or shape.

The invention also lies in the step of converting corrected signals as aforesaid into a grey scale signal for processing and/or storage and/or for forming a grey scale image in place of a colour image in a display.

The invention enables a 1-dimensional colour co-ordinate to be expressed as a function of the RGB or chromaticity, so as to remove dependence on the illumination colour temperature by converting a 2 component colour signal into a 1 component grey-scale signal, and a comparison is performed by the step of mapping, the grey-scale values to those of a similar subject observed under reference lighting conditions.

The invention has revealed that not only does there exist a colour co-ordinate where colour constancy computation is easy, there exists a co-ordinate where no computation actually needs to be done.

The grey-scale signal can factor out all dependencies due to illumination intensity and illumination colour temperature, if the chromaticities of lights lie on the Planckian locus and the camera sensors sample light like Dirac Delta functions (they have narrow-band sensitivities). If so illumination change in log-chromaticity space is translational and it follows that log-chromaticities, which are intensity independent, also translate under a change in illumination colour. Thus (ln R/G, ln B/G) becomes (ln R/G, ln B/G)+(a, b) under a different illumination.

It is important to note that the translational term (a, b) must be the same for all RGBs.

It is also a requirement that the translational term for different illuminations can always be written as $$(\alpha a, \alpha b)$$

where a and b are fixed constants and α depends on illumination. That is, illumination change translates log-chromaticities in the same direction.

It follows that the co-ordinate axis orthogonal to the direction of illumination variation, y=−(a/b)x, records only illuriinant invariant information and there exist constants $r_1$ and $r_2$ such that the co-ordinate $r_1$ln R/G+$r_2$ln B/G is independent of illumination. Of course real illuminations will rarely lie exactly on the Planckian locus nor will camera sensitivities be exactly narrow-band. However, experiments demonstrate that the invariant computation is robust to departures from either of these prerequisites.

In the foregoing no reference is made to solving for colour constancy. Rather the invariant colour co-ordinates calculated under all illuminations, including the reference light, do not change. That is, invariant computation at a pixel, and 1-dimensional colour constancy, are two sides of the same coin.

Using a derived invariant co-ordinate provided by the invention, allows colour based object recognition to be performed.

To this end objects are represented by the distributions of the invariant co-ordinates calculated from colour images of the objects; in effect using grey-scale histograms (since the invariant co-ordinate can be coded as grey-scale). Recognition is performed by distribution comparison; that is an unknown distribution is compared with object distributions stored in a database and the closest match identifies the unknown.

In one experiment a database was used of 11 images of objects viewed under a single illuminant from the Simon Fraser calibrated image dataset. Unknown images were of the same object, viewed under 4 different coloured illuminations. It was found that comparison and indexing on invariant co-ordinate distribution delivered near perfect recognition. By comparison indexing on chromaticity distributions (calculated post 2-dimensional colour constancy processing) delivered markedly poorer performance.

The invention also lies in a method of image analysis comprising the steps of comparing illumination colour temperature and/or intensity corrected signals as aforesaid or summations or other computational combinations of some or all of the corrected signals, with stored values of such signals and/or similar summations or other computational combinations thereof, to permit object recognition.

The invention also lies in a computer programmed to perform the said comparison.

In a method involving the generation of a grey scale image, the components making up the grey scale image are preferably stored as a grey scale signal for comparison purposes in object identification or comparison.

The intensity of light generated by a physical device as an output in response to an applied input signal (such as an R, G, B signal) is often not a linear function of the input signal. This is particularly relevant for cathode ray tubes (CRT) (and may also apply to solid state display panels), as are used in televisions and computer monitors. Such devices use an R, G, B signal to control an electron beam in a CRT or the colour to be produced by an addressed pixel of a display panel. Typically this non-linearity is modelled as a power function: that is, if the applied signal in, for example, the red channel is $d_r$, then the resulting intensity of light R generated by the display is given by: $R=(d_r)^\gamma$. If the value of $\gamma$ is the same for the red, green, and blue channels of the device then a single number characterises the device. In general the value of $\gamma$ may be different for the three channels, in which case, three different factors $\alpha$, $\beta$, and $\rho$ are required to characterise the device.

Given the inherent non-linearity of CRTs and other display devices, if an image is displayed on a monitor, this non-linearity must be accounted for so that a displayed image matches the original scene as closely as possible. This can be done by correcting the output signal from the camera in the following way. If the camera records a signal $R_c$, and if this value is linearly related to light intensity, then applying an inverse power function to this signal: $R^1_c = (R_c)^{(1/\gamma)}$, ensures that if this signal ($R^1_c$) is used as the input to the CRT, the resulting light intensity will be linearly related to the original light intensity of the scene. Accordingly, it is common practice for camera manufacturers to apply a power function $\gamma$, to the signals in each of the three channels, to compensate for the expected non-linearity of a display device such as a CRT based display or monitor.

Generally, it is desirable to maintain a linear relationship between the R, G, B signal and the resulting image, especially in relation to computer-enhanced or other computer processed images. Accordingly, if it is desires to perform a data processing step before, or instead of, displaying the image on a monitor or other image-forming device, it is desirable to compensate for a deliberately-applied $\gamma$ factor to the output signal from a camera (or indeed any $\gamma$ factor which may be an inherent characteristic of the camera), in order to maintain a linear relationship.

Invariance to $\gamma$ can be obtained by dividing the log camera responses by the average of the log colour responses in a local neighbourhood of the image (e.g. in all or some of the immediately adjacent pixels), prior to calculating the invariant co-ordinates. Alternatively the invariant co-ordinate can be calculated, as before, and then normalised by the average invariant co-ordinate in a local neighbourhood (e.g. for all or some of the immediately adjacent pixels) of the image.

The invention therefore provides a method of normalising $R^\alpha$, $G^\beta$, $B^\rho$ signals from a camera in which a different $\gamma$ factor applies to each of the three channels, to remove dependency on the values of $\alpha$, $\beta$ and $\rho$. It is particularly preferred that the $\alpha$, $\beta$ and $\rho$ normalisation method is employed in combination with the colour and/or intensity of illumination methods defined above.

The invention is applicable to enhancement methods and apparatus since the log of the colour response is composed of three parts, a vector due to the intensity of the illumination, a vector due to the illumination colour temperature, and a vector due to reflective properties of the surface illuminated for the purpose of producing the image.

By changing the magnitude of the intensity vector, or the magnitude of the illumination colour temperature vector for each pixel in an image, one can change the effective illumination for each pixel in the final image.

Variation of the magnitude of the illumination colour temperature vector produces a variation in depth of colour but does not alter the nature of the colour. Thus the colour warmness or colour depth can be increased or decreased by altering the magnitude of the illumination colour temperature vector, and recreating the pixel using the altered vector value. Preferably this is done by scaling all illumination colour temperature vectors for all pixels in the image.

Enhancement is thus simplified by simply altering or scaling the illumination colour temperature vector to give warmer or colder colour.

In a similar way the illumination intensity vector can be increased or decreased so as to brighten or darken the overall picture. This allows enhancement of a final image without altering the illumination or the original object producing the image.

The vector alteration may be performed on a frame basis, or on selected regions of a frame made up of many pixels, or on a pixel by pixel basis.

The invention is not limited to a three-channel colour signal system but can be applied to a multi-channel system such as a four-channel system in which the R, G and B signals are supplemented by a Z signal. This requires four sensors, the fourth sensor being sensitive to wavelengths corresponding to the Z band. This may for example be another colour in the visible range, or in the ultra-violet, or in the infra-red.

Illumination intensity dependence can be reduced by selecting a value for K such that $(R+G+B+Z)/K=1$. By dividing each of the vector values by the value K, any one of the scaled vector values can be expressed in terms of the other three scaled vector values, and the four colour signals RGB and Z can be represented by three numbers by dividing each of the R, G, B and Z signals by the sum of the RGB and Z signals and solving for one of the RGB or Z values. Where the vector can be thought of as having four component vectors each having different angles relative to four colour axes, the four angle vectors can be reduced the three angle vectors. Intensity can be normalised in a similar way by dividing each of the vector values R, B, G and Z by, for example, the G channel signal so as to produce R/G, B/G and Z/G and computing the log of each of the three quotients to give R', B' Z'. The expression (R', B', Z')+1/T(a, b, c) can be algebraically or otherwise computationally normalised so as to remove any dependency on the value of T.

Examples of three channel vectors have been given and it will be seen that using the four channel values R, G, B and Z similar co-ordinates and vectors can be defined which do not involve T, and by using a log chromaticity value, they will also not depend on illumination intensity. The same technique can readily be extrapolated to situations involving any number (n) of colour channels (e.g. to a camera having n different wavelength/waveband sensors).

The invention lends itself to various applications of which the following are merely examples.

a. Checking the colour of foodstuffs or other processed materials at the end of a manufacturing or processing line, and which may be subjected to a different illumination for the checking process from that in which they will be viewed by a consumer;
b. Checking allegedly similar objects which nay be subjected to different illuminations and identifying those which have a high degree of similarity to a standard object;
c. Distinguishing an object having a boundary relative to a background more reliably, particularly under varying and/or difficult light conditions such as when the boundary is shaded and/or the illumination varies across the scene containing the object which is being imaged;
d. Creation of image databases by illuminating and imaging objects with varying illumination and storing data relating thereto for subsequent comparison purposes, in which the invention allows the colour signals relating to the stored images to be normalised, as if all the objects had been illuminated using the same wavelength of illuminating light, and if required, also the same intensity;
e. Looking for a face in pictures, images, or scenes, and tracking same, such as in a communication system involving speech and transmission of an image of the face of the person speaking, in which the illumination of the face can vary.

MORE DETAILED DESCRIPTION OF THE INVENTION

The invention will now be further described with reference to the accompanying drawings.

Figure Captions

FIG. 1: Normalised 2500K black-body radiator: exact equation (solid line), approximation (dashed line). Note in this case the two lines are on top of each other.

Figure 2:
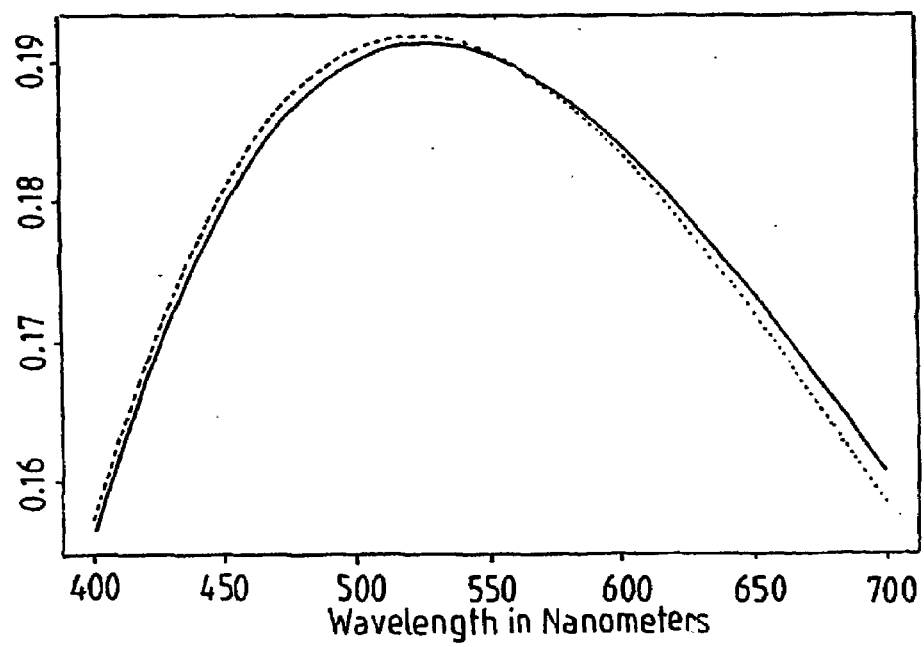

FIG. 2: Normalised 5500K black-body radiator: exact equation (solid line), approximation (dashed line).

Figure 3:
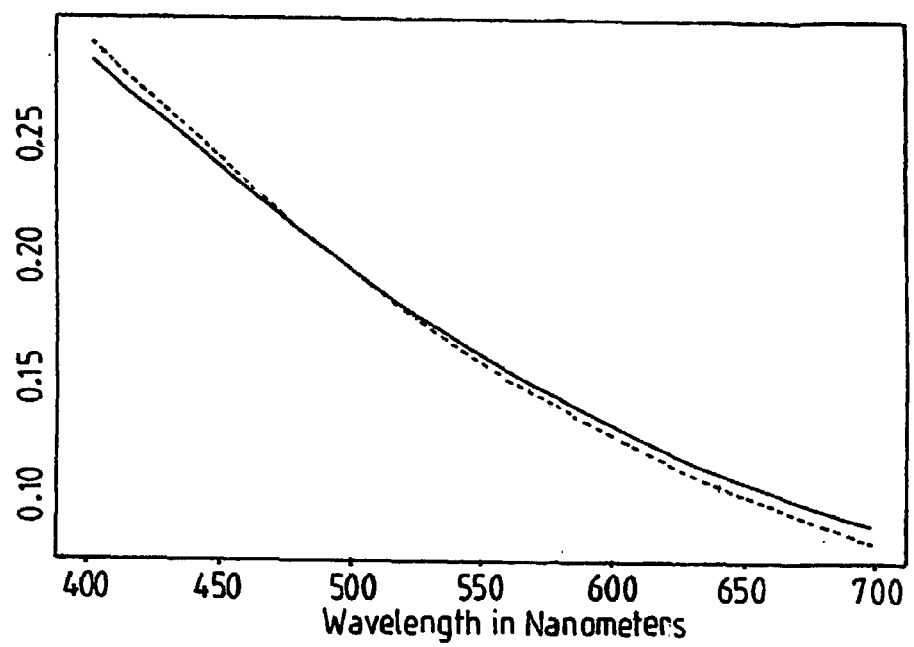

FIG. 3: Normalised 10000K black-body radiator: exact equation (solid line), approximation (dashed line).

Figure 4:
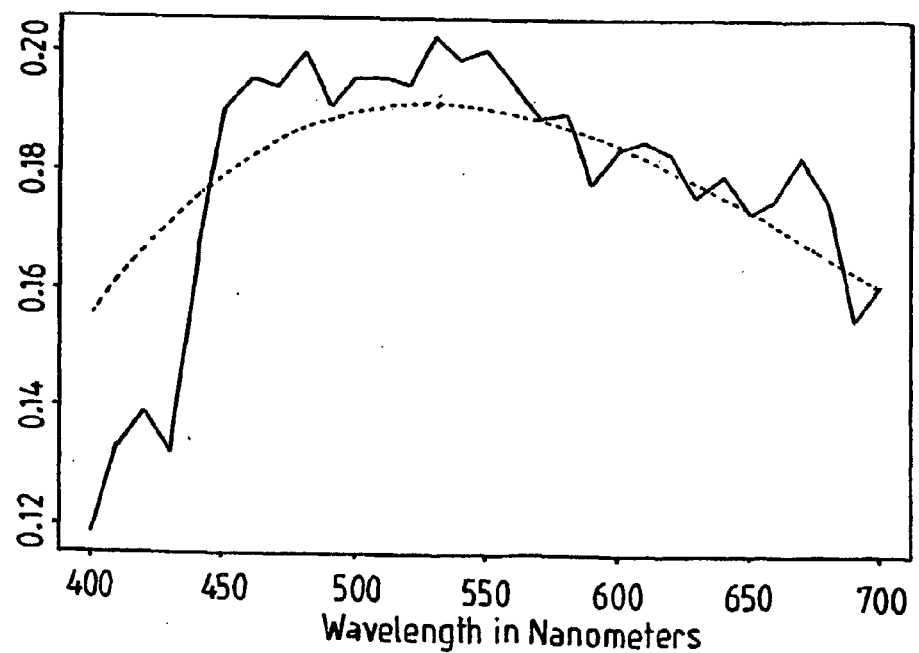

FIG. 4: Normalised 5500K CIE D55 standard daylight (solid line). Planckian illuminant (dashed line).

Figure 5:
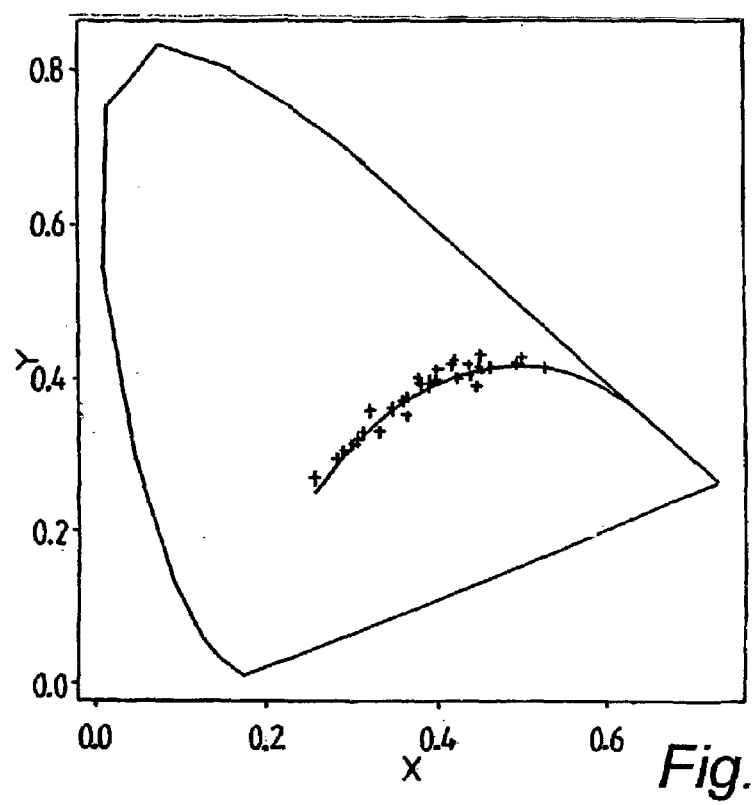

FIG. 5: CIE xy chromaticity diagram. Solid curved line is the chromaticity locus for all typical Planckian black-body lights. From left to right illuminants begin bluish, become whitish then yellowish ending in reddish light. Crosses ('+') denote chromaticities of typical natural and man-made lights.

Figure 6:
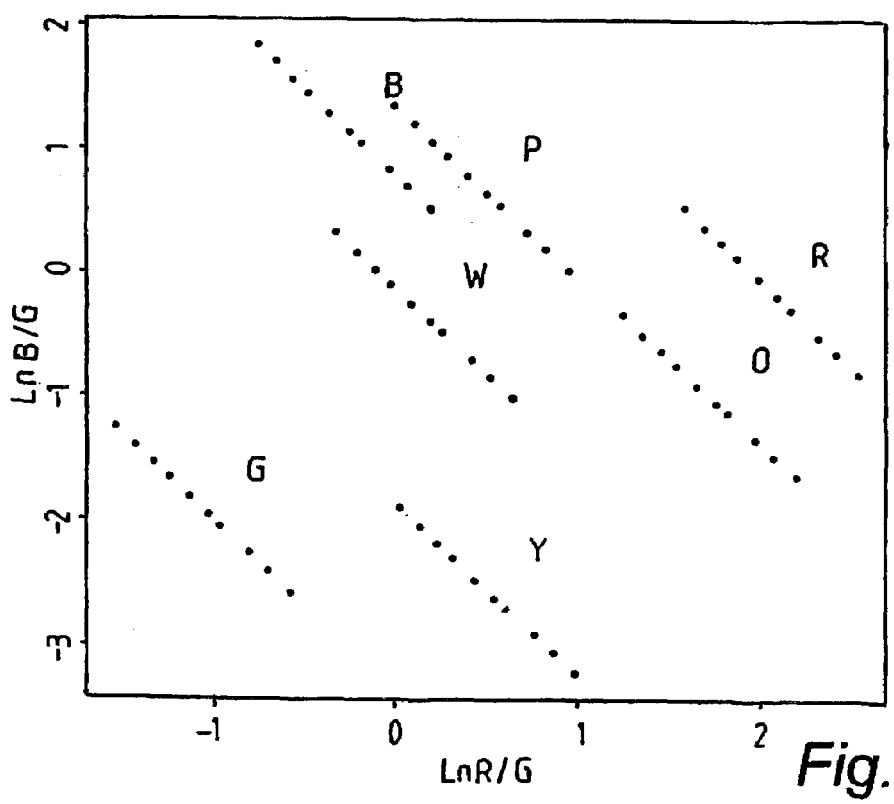

FIG. 6: Perfect Dirac-Delta camera data (sensitivities anchored at 450 nm, 540 nm and 610 nm). Log chromaticity differences (LCDs) for 7 surfaces (green, yellow, white, blue, purple, orange and red) under 10 Planckian lights (with increasing temperature from 2800K to 10000K). Variation due to illumination is along a single direction.

Figure 7:
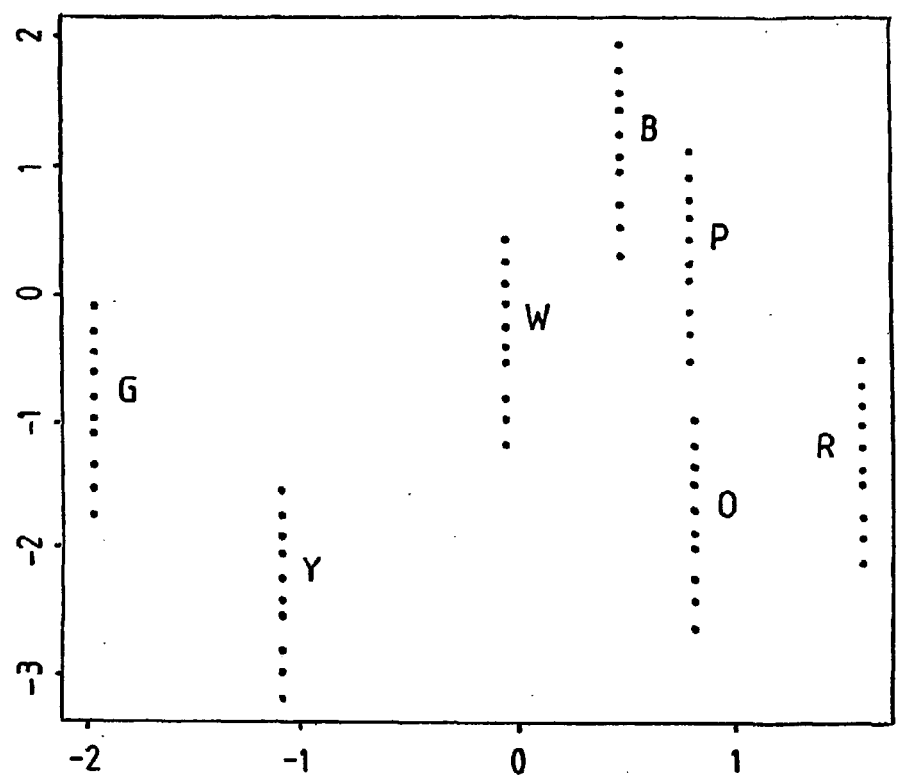

FIG. 7: Perfect Dirac-Delta camera data (sensitivities anchored at 450 nm, 540 nm and 610 nm). Log chromaticity differences (LCDs) for 7 surfaces (green, yellow, white, blue, purple, orange and red) under 10 Planckian lights (with increasing temperature from 2800K to 10000K). LCDs (from FIG. 6) have been rotated so that x co-ordinate depends only on surface reflectance; the y co-ordinate depends strongly on illumination.

Figure 8:
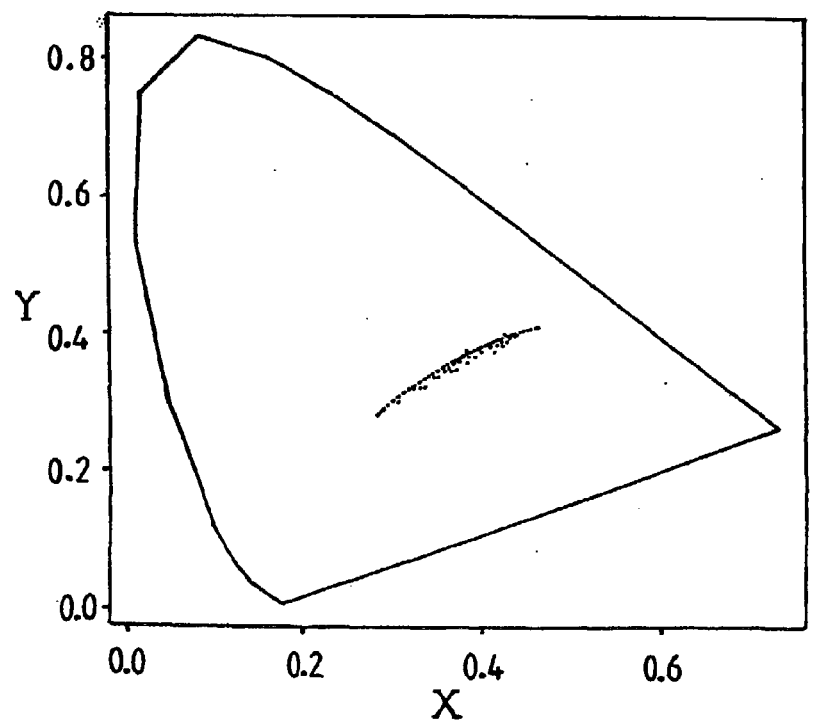

FIG. 8: CIE xy chromaticity diagram. Solid curved line is the chromaticity locus for all typical Planckian black-body lights. From left to right illuminants begin bluish, become whitish then yellowish ending in reddish light. Dots ('.') denote chromaticities of weighted averages of Planckian locus lights. It is clear that though these new illuminants do not fall on the locus, they do fall close to the locus.

Figure 9:
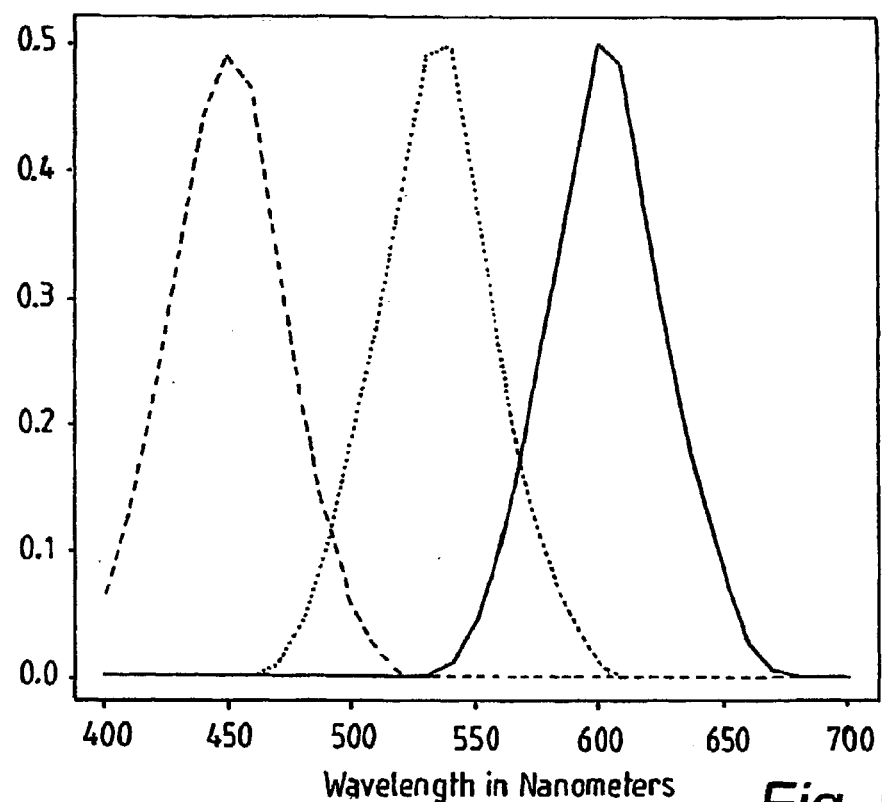

FIG. 9: SONY DXC-930 normalised camera sensitivities.

Figure 10:
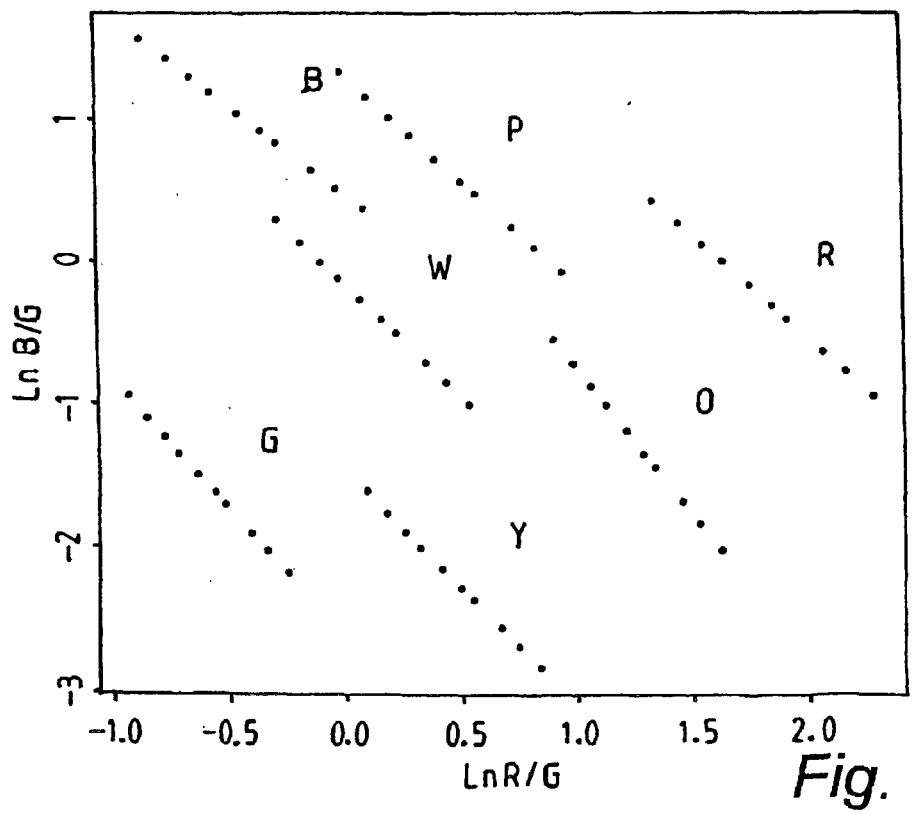

FIG. 10: SONY DXC-930 camera data. Log chromaticity differences (LCDs) for 7 surfaces (green, yellow, white, blue, purple, orange and red) under 10 Planckian lights (with increasing temperature from 2800K to 10000K). Variation due to illumination is along a single direction.

Figure 11:
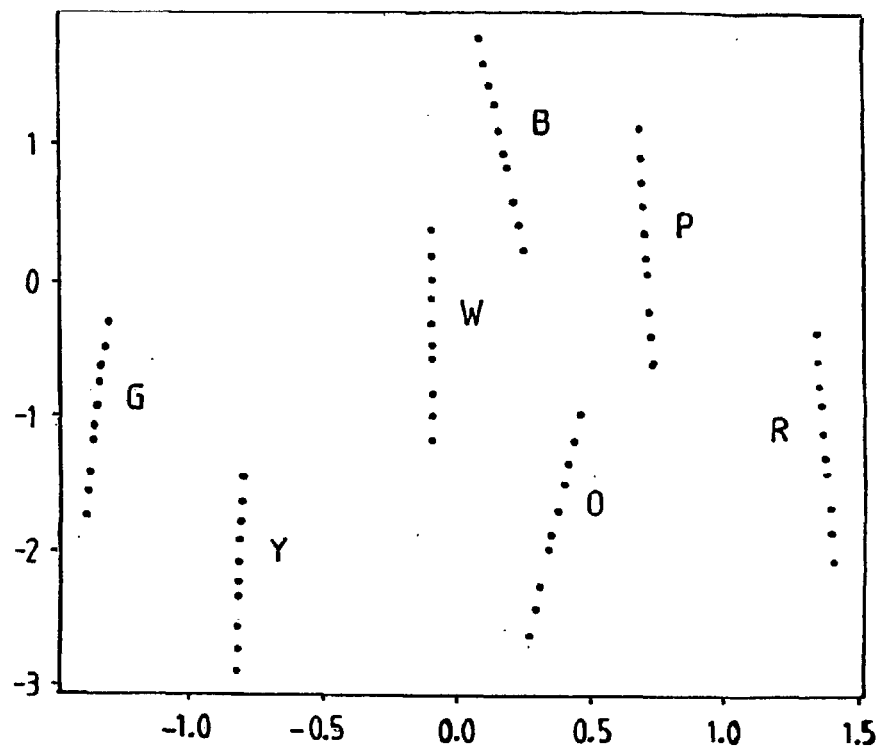

FIG. 11: SONY DXC-930 camera data. Log chromaticity differences (LCDs) for 7 surfaces (green, yellow, white, blue, purple, orange and red) under 10 Planckian lights (with increasing temperature from 2800K to 10000K). LCDs (from FIG. 9) have been rotated so that x co-ordinate depends only on surface reflectance; the y co-ordinate depends strongly on illumination.

Figure 12:
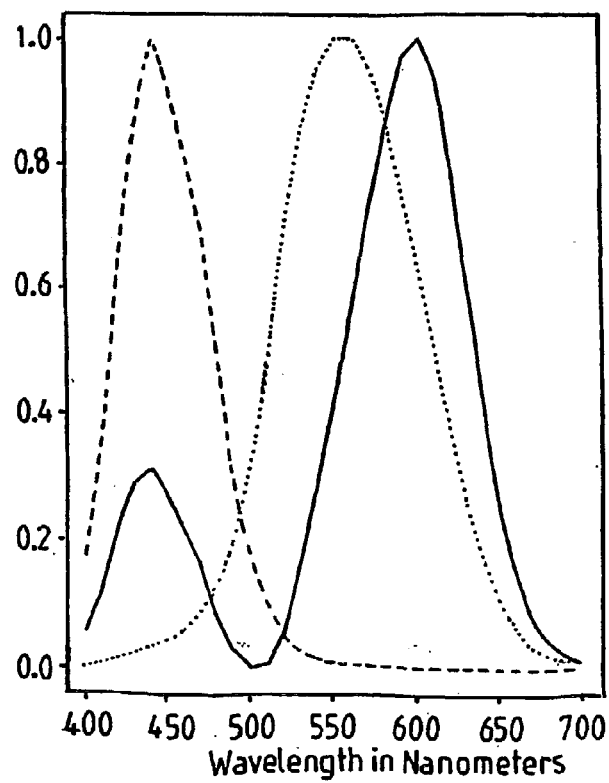

FIG. 12: Normalised XYZ colour matching curves.

Figure 13:
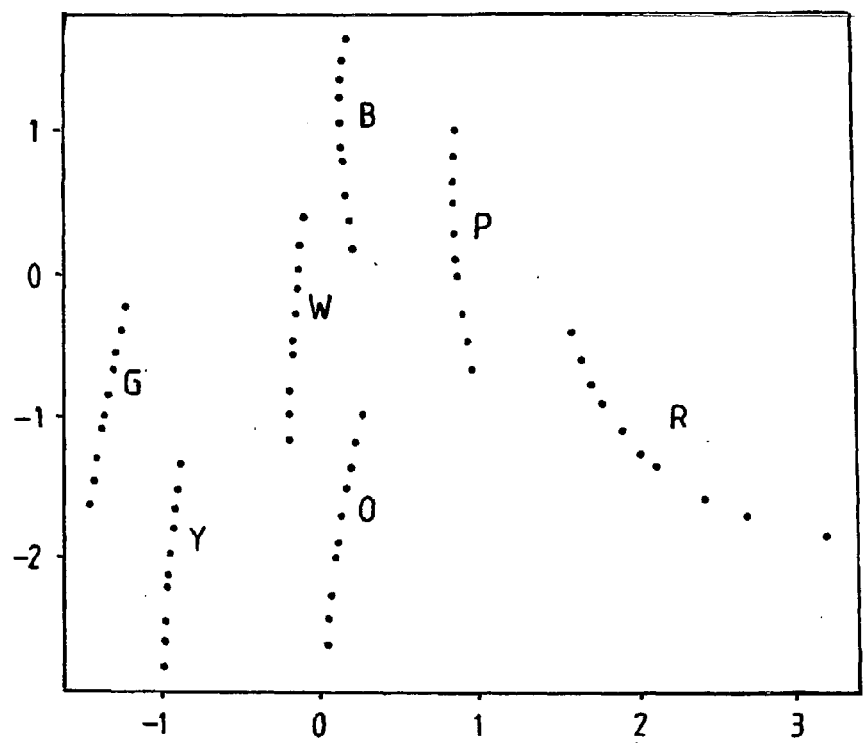

FIG. 13: XYZ tristimuli are transformed to corresponding SONY camera RGBs using a linear transformation. Log chromaticity differences (LCDs) for 7 surfaces (green, yellow, white, blue, purple, orange and red) under 10 Planckian lights (with increasing temperature from 2800K to 10000K) are calculated and rotated according to the SONY rotation matrix. The x co-ordinate depends weakly on surface reflectance; the y co-ordinate depends strongly on illumination.

Figure 14:
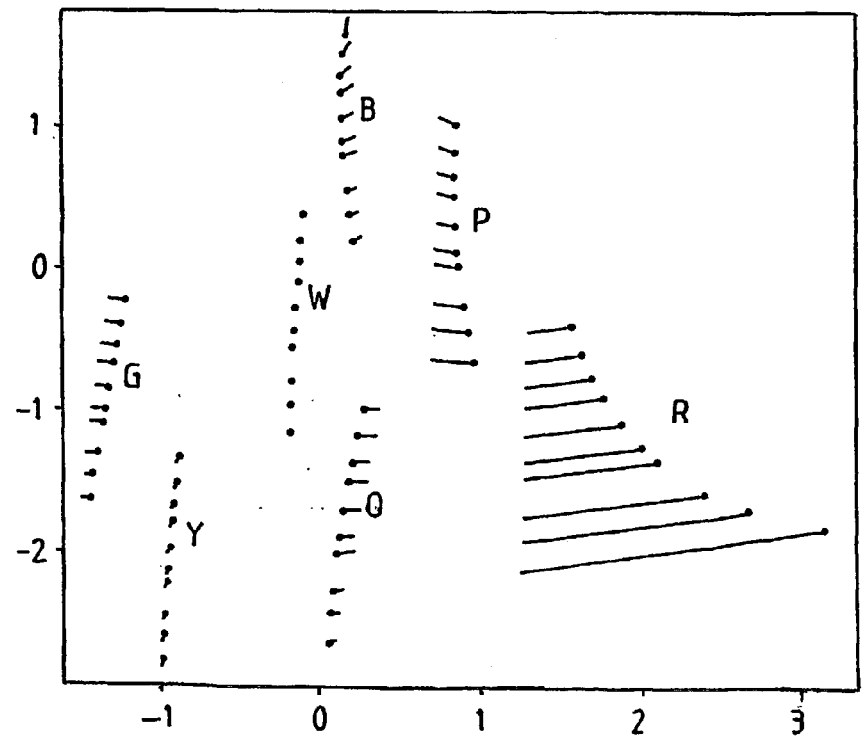

FIG. 14: LCDs are calculated for XYZ tristimuli which have been transformed to corresponding SONY camera RGBs using a linear transform are plotted as filled circles. Lines linking these approximate co-ordinates to the actual SONY LCD co-ordinates are shown.

FIG. 15: $1^{st}$ and $3^{rd}$ columns show Luminance grey scale images of a Ball and a detergent packet under 5 lights (top to bottom). $2^{nd}$ and $4^{th}$ columns show corresponding invariant images.

FIG. 16: Equations –5.

FIG. 17: Equations 6–12.

FIG. 18: Equations 13–17.

FIG. 19: Equations 18–22.

In the following description, colour image formation, the log-chromaticity coordinate space and image variation due to Planckian illumination are discussed. An invariant co-ordinate transform is subsequently derived. For cameras with Dirac delta function sensitivities and where illumination is modelled by Planck's formula derivation is analytic. For the practical case of actual cameras and actual illuminations, a statistical technique is also presented. Experimental results are also presented. Various equations referred to in the text are reproduced on the Equation pages forming part of the drawings.

BACKGROUND

An image taken with a linear device such as a digital colour camera is composed of sensor responses that can be described by Equation (1), shown in FIG. 16, in which $\lambda$ is wavelength, $P_k$ is sensor response, k=R, G, B (red, green and blue sensitivity), E is the illumination, S is the surface reflectance and $R_k$ is a camera sensitivity function. Integration is performed over the visible spectrum w.

Let us assume that the camera sensitivity can be expressed as a Dirac delta function, having significant sensitivity only at some wavelength $\lambda_k$. Then in general $R_k(\lambda)=\delta(\lambda-\lambda_k)$. Dirac delta functions have the well known sifting property that allow us to rewrite Equation (1) as Equation (2), shown in FIG. 16.

Clearly, under $E_1(\lambda)$ and $E_2(\lambda)$ the RGB response for a particular surface can be related, thus giving Equation (3), as shown in FIG. 16.

It is to be noted that the diagonal matrix relating the RGBs across illumination does not depend on surface reflectance. The same 3 scalars relate all corresponding pairs of RGBs. To ease the notation Equation (3) can be rewritten as Equation (4), shown in FIG. 16, where the subscript denotes dependence on a particular illumination.

One application for the invention is in a process which involves checking the colour of foodstuffs or other processed materials or the colour and/or pattern of manufactured articles such as ceramic tiles, at the end of a manufacturing or processing line.

In judging goods such as food, fruit, or ceramic tiles, it is often important to replicate typical viewing conditions. The visual appearance of goods if judged by human experts will often be performed under a variety of different lighting conditions although the human expert invariably seems to compensate for the different colour temperatures of the different illuminations to a certain extend. However the reasoning is that by checking under a variety of different lighting conditions, correlates with the different lighting conditions encountered by the average observer (eg average consumer). It follows then that in automating a quality control/inspection process, it is advantageous to provide a system that can work in similarly unconstrained viewing conditions. Unfortunately this has proven to be hard to do since the human eye and brain carries out some, as yet unknown, intelligent processing of images so that some effects produced by different viewing illuminants are discounted. Thus for example, a human being can judge the ripeness of fruit equally well under daylight conditions (where the light is bluish) or indoors under incandescent light (where the light may be orangish).

The present invention provides a corrected or adjusted colour signal (typically an PGB signal) which is a reflectance correlate which is stable under a plurality of different illuminating light colours (ie temperatures) and intensities. Any image analysis that is based on this correlate performed on the correlated/adjusted signals will, like the processing carried out by a human inspector, likewise be unaffected by viewing conditions. An ability to be able to inspect goods under arbitrary lighting conditions will be particularly useful when viewing conditions cannot be held fixed (eg in the checking of harvested foodstuffs for colour and/or size and/or shape under non-uniform or even varying lighting conditions such as can occur during the day or from day to day outdoors and/or indoors where outside (natural light) is a component of the illumination incident on the foodstuff.

The same varying light conditions can apply when manufactured articles are being checked for accuracy of pattern, position of pattern, and colour such as in the case of ceramic tiles.

In both cases, by adjusting and correcting the viewing system output signal so as to remove variations due to different coloured illumination and different intensity of illumination, the resulting corrected/adjusted signals can be subjected to image analysis in the knowledge that any variation in illumination (colour or intensity) will not produce incorrect results.

The substitution of a Dirac delta function for $R_k(\lambda)$ has clearly simplified the image formation equation.

Unfortunately, no camera could possibly, or usefully, be sensitive to only 3 narrow-band wavelengths of light and Equation (4) does not really account for image formation in typical cameras. Fortunately, research has shown that Equation (4) models image formation fairly well for cameras whose response sensitivities are sufficiently narrow-band. Even when Equation (4) does not hold, it can often be made to hold by applying an appropriate change or sensor basis. It is pointed out that this result is based on a statistical analysis which takes account only of "reasonable" illuminating lights and surfaces. This is an important point to bear in mind since, for all but the special case of Dirac delta function sensitivities, it is always possible to hypothesise sets of illuminating lights and surfaces for which Equation (4) will not hold. In practice however, Equation (4) is, or can be made to be, a tolerable approximation for most real cameras. Henceforth it is assumed that Equation (4) is a good model of image formation across illumination, and this has been verified by experiment (see later).

Remarkably, even Equation (4) is an over general model of image formation. Illumination colour is not arbitrary and so the scalars $\alpha$, $\beta$ and $\gamma$ in Equation (4) are not arbitrary either. Because illuminating light is always a positive function (i.e. its power cannot be negative), the scalars themselves must also be positive. However, some positive power spectra do not occur as illuminations e.g. saturated purple illuminations do not occur in nature. An implication of this observation is that certain positive triples of scalars are impossible since they serve only to model the relation between illumination pairs that do not actually occur.

Let us suppose that illumination might be modelled as a black-body radiator using Planck's equation (Equation (5)), shown in FIG. 16.

Equation (5) defines the spectral concentration of radiant excitance, in Watts per square meter per wavelength interval as a function of wavelength $\lambda$ (in meters) and temperature T (in Kelvin). The constants $c_1$ and $c_2$ are equal to $3.74183\times10^{-16}$ and $1.4388\times10^{-2}$ mK respectively.

In accompanying FIGS. 1, 2 and 3 the normalised black-body illuminants for temperatures of 2500K, 5500K and 10000K are plotted. It is evident (and very well known) that as the temperature increases so the spectrum of light moves from reddish to whitish to bluish. The range 2500K to 10000K is the most important region in terms of modelling typical illuminant colours.

In FIG. 4, the normalised spectral power distribution of a typical Daylight illuminant (CIE standard daylight source D55) and a 5500K Black-body radiator are compared. It is clear that the shape of the two illuminant curves is broadly similar.

In general Planck's equation captures the general shape of incandescent and daylight illuminants. Of course, while the shapes may be similar, Equation (5) does not account for varying illuminant powers. To model varying power an intensity constant I is added to Planck's formula, giving rise to Equation (6), shown in FIG. 17.

While the shape of daylight and Planckian radiators is similar, this is not true for fluorescents (which tend to have highly localised emission spikes). But, remarkably, even here Equation (6) can be used, because interest lies not in spectra per se, but rather in how they combine with sensor and surface in forming RGB components in the colour signal. For almost all daylights and typical man-made lights, including fluorescents, there exists a black-body radiator, defined in (6), which, when substituted in (1), will induce very similar RGB components for most surface reflectances. Interestingly, if such a substitution cannot be made, the colour rendering index (broadly, how good surface colours look under a particular light) is poor. Indeed, the lighting industry strives to manufacture lights such that their chromaticities lie close to the Planckian locus and which induce RGB components, for most surface reflectances, which are similar to those induced by a corresponding black-body radiator.

In FIG. 5 is plotted the xy chromaticity diagram. The solid curving line maps out the chromaticity locus of Black-body radiators from 100K to 20000K (from right to left). The chromaticities have also been plotted for 36 typical illuminants (including daylights and artificial lights) measured around the Simon Fraser University campus. It is evident that all of these illuminants fall very close to the Planckian locus.

Perhaps more interesting is the question of whether a Planckian illumination substituted for the fluorescent illumination in Equation (1) would render similar colours. To evaluate this the following experiment was carried out.

Using the XYZ standard observer functions for the human visual system CIE Lab coordinates were calculated for the 170 object reflectances measured by Vrhel et al (Colour Reasearch and Application 19: 4–9, 1994) under each of the 36 SFU illuminants (Lab coordinates are a non-linear function of XYZ tristimuli). The CIE Lab coordinates were then calculated for the same surfaces when a Planckian illuminant (a spectra corresponding to Equation (6)) is substituted for the actual illuminant. The Euclidean distance, ΔE error, between the Lab coordinates for the true illuminant, and the Planckian substitute, were calculated for each surface. (Euclidean distances in CIE Lab roughly correlate with perceived perceptual differences). For each light the mean ΔE was calculated between the actual and Planckian substituted Lab coordinates. The average over all 36 means was found to be 2.24 with a maximum mean of 6.44.

Meyer et al have found that mean ΔEs of as large as 5 or 6 are acceptable in image reproduction i.e. images are similarly and acceptably rendered. One may thus reasonably conclude, that for 36 illuminants, a Planckian substitution can be made (the perceived perceptual rendering error is quite small).

Of course, the XYZ human observer sensitivities are not in general the same as digital camera sensitivities. That is, accurate rendering for the visual system need not imply accurate rendering for a camera. Fortunately, the responses of most cameras (and certainly all those known to the Inventors) are, to a tolerable approximation, transformable to corresponding XYZs. Accurate rendering of XYZs, for reasonable surface reflectances, implies accurate rendering of RGBs.

Colour Constancy at a Pixel

Considering next the above model of image formation together with Planck's equation it can be shown that there exists one coordinate of colour, a function of RGB components, that is independent of light intensity and light colour (where colour is defined by temperature). However, to make the derivation cleaner a small (and often made) simplifying alteration to Equation (6) is made. In Planck's equation $\lambda$ is measured in meters; thus we can write wavelength $\lambda = x \ast 10^{-7}$ where $x \in [1, 10]$ (the visible spectrum is between 400 and 700 nanometer $10^{-9}$). Temperature is measured in thousands of degrees Kelvin or equivalent $t \ast 10^3$ (where $t \in [1, 10]$). Substituting into the exponent of Equation (6) gives Equation (7), shown in FIG. 17.

Because t is no larger than 10 (1000K) and there is no significant visual sensitivity (for humans or most cameras) after 700 nm, $x \leq 7$, it follows that $$e^{\wedge}\frac{1.4388 \ast 10^2}{xt} \gg 1$$

and Equation (8) follows.

FIGS. 1 to 3 contrast the Black-body illuminants derived using Equation (8), shown in FIG. 17, with those defined by Equation (6) for temperatures of 2500K, 5500K and 10000K. It is clear that the approximation is very good (in particular the two spectra for 2500K overlay each other exactly).

Substituting Equation (8) in Equation (2) gives Equation (9), shown in FIG. 17.

Taking natural logarithms of both sides of Equation (9), shown in FIG. 17, gives Equation (10), shown in FIG. 17.

That is, log-sensor response is an additive sum of three parts: ln I (depends on the power of the illuminant but is independent of surface and light colour); $\ln(S(\lambda_k)\lambda^{-5}_k c_1)$ which depends on surface reflectance but not illumination) and $$-\frac{c^2}{T\lambda}$$

(which depends on illumination colour but not reflectance).

Remembering that, in Equation (10), $P_k = R, G, B$; there are three relationships which exhibit the same structure: each of the lnR, lnG and lnB sensor responses are an additive sum of intensity, surface and illumination components. By cancelling common terms, it can be shown that two new relations can be derived which are intensity independent (but depend on illumination colour) and from these a final relation which depends only on reflectance.

Begin by introducing the following simplifying notation: let $S_k = \ln(S(\lambda_k)\lambda^{-5}_k c_1)$ and $$E_k = -\frac{c^2}{T\lambda}$$

(k=R, G, B sensor). The following two relations, red and green, and blue and green log-chromaticity differences (or LCDs), are independent of light intensity:

Note that Equation (11), shown in FIG. 17, is basically a recapitulation of a result that is well known in the literature. There are many ways in which intensity or magnitude might be removed from a 3-d RGB vector. The one that makes the subsequent colour temperature analysis easier is selected.

It is useful to think of Equation (11) in terms of vectors ie:

$$|p'_R|$$
$$|p'_B|$$

is a sum of the vector $$|S_R - S_G|$$
$$|S_B - S_G|$$

plus the vector $$|E_R - E_G|$$
$$\frac{1}{T}|E_B - E_G|;$$

where $$\frac{1}{T}$$

is a scalar multiplier.

Written in this form Equation (11) is the equation of a line written in vector notation. In changing surface reflectance, only the first term on the right-hand side of Equation (11) changes. That is, the lines defined by different surfaces should all be simple translations apart.

Of course, this result is predicated on the approximate Planckian model of illumination Equation (8). To test if this result holds for real Planckian black-body illuminants (Equation (6)), sensor responses for seven surfaces under 10 Planckian lights (using narrow-band sensors anchored at 450 nm, 540 nm and 610 nm) are numerically calculated, using Equation (1). The 7 surfaces comprise the Macbeth colour checker reflectances labelled green, yellow, white, blue, purple, orange and red. The 10 Planckian illuminants were uniformly spaced in temperature from 2800K to 10000K. The LCDs (Equation (11)) were calculated and the resulting 2-dimensional coordinates are plotted in FIG. 6. As predicted, as the illumination changes the coordinates for a given surface span a line and all the lines are related by a simple translation.

Now using the usual rules of substitution it is also a simple matter to derive a relationship that is independent of temperature. This relationship is shown in Equation (12), shown in FIG. 17, where all $S_k$ and $E_k$ are independent of illuminant colour and intensity. Equation (12) shows that there exists a weighted combination of LCDs that is independent of light intensity and light colour. It is thereby shown that the 1-dimensional colour constancy problem at a pixel can be solved.

It is useful to visualise the geometric meaning of Equation (12). For a particular surface, all LCDs for different lights fall on a line y=mx+c or in parameterised coordinate form (x, mx+c). In Equation (12) a linear combination of the x and y coordinates is calculated: (a'x+b'(mx+c)), $$\left(\text{where } a' \text{ and } b' \text{ are the constants 1 and } -\frac{E_R - E_G}{E_B - E_G}\right).$$

Clearly if we scale a' and b' by some term v giving va' and vb', the illuminant invariance of (12) is unaltered. Without loss of generality v, a=va', b=vb' can be chosen, such that the vector [a b]$^t$ has unit length.

Calculating the illuminant invariant as the vector dot product ('.') gives Equation (13), shown in FIG. 18.

The meaning of Equation (13) is geometrically well understood: the log-difference coordinate is projected onto the axis [a b]; where this axis is chosen to be orthogonal to the direction of the variation due to illumination.

The following Equation (14), shown in FIG. 18, rotates the log-difference coordinate axis so that the resulting x axis records illuminant independent information and the y axis captures all the variation due to illumination.

The log difference data shown in FIG. 6 is rotated according to Equation (14). The result is shown in FIG. 7.

Approximate Invariance

If a camera has Dirac Delta functions then the invariant co-ordinate transform can be calculated analytically. When camera sensor sensitivities are not perfect Dirac Delta functions (and they rarely are) then the best illuminant invariant quantity must be found statistically.

There are two steps involved in finding an invariant. First it is necessary to make sure that the camera response across illumination follows the diagonal matrix model of Equation (4). Second, an equation of the form of Equation (14) must be found.

Worthey and Brill (Heuristic analysis of von Kries colour constancy—Journal of the Optical Society of America A,3: 1708–1712, 1986) found that so long as a camera is equipped with fairly narrow sensitivities, e.g. with a support of 100 nm, the diagonal model will hold. When sensitivities are significantly broader e.g. in excess of 300 nm in the case of the human visual system the simple model of Equation (4) does not hold. However, in a series of works, Finlayson, Drew and others (see Spectral Sharpening: Sensor transformations for improved colour constancy: Journal of the Optical Society of America a,11(5): 1553–1563, May 1994) found that new narrower-band sensitivities could be formed from broad band sensitivities by calculating an appropriate sharpening transform. The diagonal model, relative to the sharpened sensors, once again is quite accurate. Effective sharp transforms have been shown to exist for the broad band sensitivities of the human cones and the spectrally broad band Kodak DCS 470 camera (and all other broad band sensor sets known to the Applicants). Henceforth Equation (4) is assumed applicable.

It is pointed out that Equation (4) is a necessary, not sufficient, condition for the analysis to proceed. In the strictest sense the diagonal model of illumination change must occur in tandem with device sensitivities integrating spectral stimuli like Dirac Delta functions. This was in fact found to be true for a sharp transform of XYZ sensitivities. However, the statistical method set forth below can now be applied without explicitly enforcing the Delta function equivalence.

To discover the appropriate invariant, it is necessary to understand how LCDs for different surfaces, under Equation (4), relate to one another and more specifically how this relationship can be used as a means for finding the best invariant. It is possible to consider an image of a particular surface reflectance $S^j(\lambda)$ under a set of representative illuminants: $E_1(\lambda), E_2(\lambda) \ldots E_m(\lambda)$. Using Equations (1) and (11), the set of m LCD vectors $Q_1^i, Q_2^i, \ldots Q_m^i$ can be calculated. Assuming that the camera behaves approximately like a Dirac Delta camera, then the LCDs should all be approximately co-linear. By subtracting the mean LCD, this line can be moved so that it passes through the origin, giving Equations (15a) and (15b), each shown in FIG. 18.

Because of the invariance properties derived and discussed hitherto, the mean-subtracted points for another surface $S^j(\lambda)$, $q_1^j, q_2^j, \ldots q_m^j$ must also lie on a similarly orientated line (which again passes through the origin). Now taking n representative surfaces, n sets of mean-subtracted LCDs can be generated and placed in the columns of a 2×nm matrix M, Equation 16, shown in FIG. 18.

The co-variance matrix of this point set is given by Equation (17), shown in FIG. 18.

Equation 14 cast the invariant computation as a rotation problem in LCD space. We do likewise here and note that if we can find a rotation matrix R such that the rotated points $$Rq_k^i = \begin{bmatrix} \in \\ x \end{bmatrix}$$

(where $\in$ is as small as possible) then good invariance should follow, since Equation (18) applies, where x denotes an illuminant varying quantity which is not of interest. Under the assumption that $\in$ is small, the first coordinate of the rotated LCDs will be approximately invariant to illuminant change: it is equal to the dot-product of the first row of R with the mean vector $\mu^i$.

To find the rotation satisfying Equation (18), shown in FIG. 19, it is necessary to find the co-ordinate axis along which the variation (or variance) due to illumination is minimum. To do this first note that covariance matrix $\Sigma(M)$ can be uniquely decomposed, as in Equation (19), shown in FIG. 19, where U is a rotation matrix and D is a strictly positive diagonal matrix where the diagonal terms of $D_1$, $D^{1,1}=\sigma_1^2$ and $D_{2,2}=\sigma_2^2$, are ordered: $\sigma_1^2>\sigma_2^2$. Simple algebra establishes Equation (20), shown in FIG. 19.

Thus, the diagonal entries of D are the variances of M under rotation U. Furthermore, over all choices of rotation matrix U, it can be shown that $\sigma_1^2$ is the maximum variance that can be achieved and $\sigma_2^2$ the minimum. It follows then that R can be defined in terms of U: the first and second rows of R equal the second and first rows of U ([$R_{11}$ $R_{12}$]=[$U_{21}$ $U_{22}$] and [$R_{21}$ $R_{22}$]=[$U_{11}$ $U_{12}$]).

Invariance Across Devices

In setting forth the above (both the analytic and statistical methods), it is clear that the derivation is camera specific. That is, the invariant information that is available changes with the imaging device. It is interesting however, to ask whether the similar invariant information might be calculable across different cameras. The answer to this question is trivially true if there exists a one to one mapping that takes the RGB response of an arbitrary camera to a corresponding RGB response for some fixed canonical camera. Unfortunately, such a mapping, save under very restrictive circumstances, cannot exist for all lights and surfaces; there will always exist pairs of physical stimuli that induce identical responses (they are meters) with respect to one camera but induce quite different responses with respect to a second camera. However, in practice, the one to one mapping holds for most reasonable stimuli.

Drew and Funt (Natural Metamers: CVGIP:Image Understanding, 56:139–151, 1992) demonstrated that if the colour signal (the product of light and surface reflectance) spectra are described by a 3-dimensional linear model (approximately true for many natural reflectance spectra viewed under daylight) then RGBs across two different cameras are linearly related. This work has been generalised with the understanding that it is not spectra per se which are of interest but how they project down onto RGBs. Empirical evidence has been presented which shows that the recorded RGBs, for a large corpus of physical stimuli and a variety of colour devices, are linearly related (to a good approximation).

It follows that to find an invariant co-ordinate across devices it is appropriate to:

1. Find the linear transform T which best maps the RGBs for a given device to corresponding RGBs for a canonical device:

$$T\underline{p}^d \approx \underline{p}^c$$

where the superscripts d and c denote a given device and the standard reference canonical device.

2. Calculate for the canonical device the best invariant can be calculated using either of the methods set forth in Equations (7) to (20). Denoting the invariant calculation as, the function f: R×R×R→R , then invariant information for $\underline{p}^d$ is calculated as:

$$f(T\underline{p}^d) \approx f(\underline{p}^c)$$

If the canonical device is chosen to be a hypothetical camera that is equipped with Dirac Delta function sensitivities then T can be thought of as a sharpening transform.

Multiple Illuminants

Often in colour constancy research it is interesting to consider situations where there are multiple illuminants present in a scene. So long as the effective illuminant (which may be a combination of the multiple light sources) lies on the Planckian locus, the derivation of Equations (7) to (11) applies and invariance is assured. However, it is reasonable to assume that there may be some averaging of light sources. For example, if $E_1(\lambda)$ and $E_2(\lambda)$ are spectrally different light sources both incident at a point in a scene, then due to the superposition of light, the effective illumination $E(\lambda)$ is equal to $E_1(\lambda)+E_2(\lambda)$. Assuming that $E_1(\lambda)$ and $E_2(\lambda)$ lie on the Planckian locus and have temperatures $T_1$ and $T_2$ and intensity constants $I_1$ and $I_2$, then Equation (21), shown in FIG. 19, applies.

Because the Planckian locus is convex, no Planckian illuminant can be written as a convex sum of any other two Planckian. For all choices of constants $I_3$ and $T_3$, Equation (22), shown in FIG. 19, results.

Fortunately, the Planckian locus, in the region that spans typical illuminants is only very weakly convex. As such, while additive combinations of Planckian illuminants cannot lie on the Planckian locus, they will lie close to the Planckian locus. In FIG. 8, we have plotted the xy chromaticity diagram, the Planckian locus between 2800K and 10000K (the range of typical lights) and the chromaticities of 190 illuminants (created by taking weighted convex combinations of Planckian illuminants in this range). All lights lie on or close to the Planckian locus. That is, we expect the derived illuminant invariant to be stable even when there are additive light combinations.

Experiments

FIG. 9 shows normalised spectral sensitivity functions of a SONY DXC-930 3-CCD digital camera. It is evident that these sensors are far from idealised delta functions. Each is sensitive to a wavelength interval over 100 nm in extent. Thus, at the outset it is necessary to test the adequacy of the illumination invariant representation. Using Equation (1) the SONY camera response for seven surfaces under 11 Planckian lights were generated. As in FIG. 6 (the experiment using Dirac Delta function sensitivities), green, yellow, white, blue, purple, orange and red reflectances drawn from the Macbeth colour checker were used along with 10 Planckian black-body illuminants evenly spaced in temperature from 2800K to 10000K. The corresponding log-chromaticity differences (LCDs) were calculated and the resulting 2-dimensional coordinates are plotted in FIG. 10. The rotated co-ordinates, calculated using the approximate invariant method outlined hitherto, are shown in FIG. 11.

It is evident that for camera responses the variation in log-chromaticity due to illumination is not spread along a single direction. The calculated invariant (Equation (13)) is only approximate. Yet, for particular surfaces the LCDs do fall on a line. Moreover, while the direction of these lines do vary as a function of surface colour they do not vary much. We conclude then that for the SONY camera it is possible to calculate a single colour feature that has very weak dependence on illumination.

To quantify the magnitude of the dependence the following experiment was carried out.

Using the technique hitherto set forth under Approximate Invariance, the optimal invariant for 170 object reflectances and the 10 Planckian illuminants are calculated. For the ith reflectance calculate $\sigma_i^2$; namely the variance of the invariant co-ordinate over the 10 lights. The sum of all 170 individual variances gives us a measure of the error variation in the signal: $\sigma_E^2 = \Sigma_i \sigma_i^2$. The total variance calculated for the invariants of all 170 surfaces viewed under the 10 lights (the signal variance), is denoted: $\sigma_S^2$. The signal to noise ration, $\sigma_S/\sigma_E$, advises how large the signal is relative to the error. For this data the SNR was found to be approximately 23, that is the signal is 23 times as large as the noise. Two informal conclusions can be drawn. First, that the invariant is sufficiently stable to allow, on average, up to 23 colours to be distinguished from one another. Second, that the invariant conveys slightly more than 4 'bits' of information.

By definition the invariant is chosen that minimises $\sigma_E$. However, it would be equally possible to find the co-ordinate direction that maximises the variation due to illumination e.g. the vector $[U_{11} U_{12}]$ in Equation (19) which is in the direction orthogonal to the calculated invariant. Relative to this worst case co-ordinate, the calculated invariant can be expected to have a much lower signal to noise ratio. Indeed, the ratio was found to be 1.9. That is, the signal variation due to reflectance is only twice as large as that due to illumination. Informally, it would only be possible to reliably discriminate two colours.

This experiment was repeated using the 10 Planckian lights and 180 new illuminants formed by taking additive combinations of Planckian illuminants (see FIG. 8). These new lights simulate common lighting conditions such as outside daylight mixing with indoor incandescent illumination. As discussed in Invariance across devices, most of these lights necessarily lie off-locus and so the invariant calculation is in this case only approximate and so a lower SNR can be expected. The signal to noise ratio was found to be reduced from 23 to 15. This indicates that the calculated invariant is quite robust to many typical lights and lighting conditions (it is still possible to calculate 4 bits of information).

Being interested in evaluating the similarity of invariant information calculated across devices, using the XYZ colour matching functions, plotted in FIG. 12, the XYZ response was calculated for the red, green, yellow, purple, white, blue and orange patches under the 10 Planckian illuminants. The best 3×3 matrix transform mapping XYZs to corresponding SONY RGBs was found. Finally the LCDs were calculated and rotated according to the rotation matrix derived for the SONY camera. The resulting co-ordinates are shown in FIG. 13 and are contrasted with the actual SONY co-ordinates in FIG. 14. It is evident that device independent information is calculable. Though, some reflectances are clearly less stable than others.

In order to test the invariant calculation on real camera images, 10 SONY DXC-930 images (from the Simon Fraser dataset) of two colourfull objects (a beach ball and a detergent package) were taken under the following 5 illuminants:

Macbeth fluorescent colour temperature 5000K (with and without blue filter),
Sylvania Cool white fluorescent,
Philips Ultralume,
Sylvania Halogen.

These illuminations constitute typical everyday lighting conditions; i.e. yellowish to whitish to bluish light. The luminance grey-scale images, calculated by summing R+G+B, are shown in the first and third columns of FIG. 15. It is clear that the simple luminance grey-scale is not stable across illumination. In columns 2 and 4 the corresponding invariant grey-scale images are calculated. It is equally clear that the grey-scale pixels in these images do not change significantly as the illumination changes. Also notice that qualitatively the invariant images maintain good contrast. Not only has illumination invariance been obtained but the images that result are visually salient.

As a concrete test of the utility of the calculated illuminant invariant a set of object recognition experiments were carried out. To the beach ball and detergent packages were added 9 other colourful objects. These too were imaged under all 5 lights. For all 55 images their respective grey-scale invariant histograms were calculated and then used as an index for object recognition. Specifically each light was taken in turn and the corresponding 11 object histograms used as feature vectors for the object database. The remaining 44 object histograms were matched against the database; the closest database histogram being used to identify the object.

It was found that a 16 bin invariant grey-scale histogram, matched using the Euclidean distance metric, delivers near perfect recognition.

Almost 96% of all objects were correctly identified. Moreover, those incorrectly matched, were all found to be the second best matching images.

This performance is really quite remarkable. Funt et al, hitherto referred to, measured the illumrinant using a spectra-radiometer and then corrected the image colours based on this measurement (so called perfect colour constancy). Objects were indexed by matching corrected chromaticity histograms. Surprisingly, only 92.3% recognition could be achieved. Moreover, at least one object was matched in 4th place (the correct matching histogram was the fourth best answer).

That 1-d invariant histograms apparently work better than 2-d colour histograms is at first glance hard to understand. Two explanations have been considered. Given a measurement of the light it is not possible to exactly map RGBs from one lighting condition to another and so perfect match performance cannot be expected. However, the performance that is seen must depend on the properties of the colour space being used. That is, a first possible explanation is that if a 1-d coordinate, such as the invariant presented here, is relatively robust (relative to other choices of colour space) to illuminant change (there was negligible mapping error for that coordinate) then it might be expected that the invariant coordinate would support relatively good performance. Unfortunately, this explanation though appealing (it would be pleasing if our derived invariant was found to have additional nice properties) was not found to be true. Indeed, it was found that the absolute residual error found after correcting for the illuminant was actually relatively high in the direction of the derived invariant. That is, viewed from a mapping error perspective alone, one might expect the 1-d histograms to support poorer indexing.

The second possible explanation rests on the colour space being used. In the original experiments of Funt et al, previously referred to, the traditional rg chromaticity space, which is bases on R, G and B camera responses, is used. In this invention the derived invariant is base on In R, In G and in B responses. Experiments, reported elsewhere, on the same data set, have found that a log chromaticity space supports more accurate indexing than conventional chromaticity space. It is speculated that indexing based in log colour space might work better because the logarithm function maps raw RGBs to more perceptually meaningful quantities; since Euclidean colour differences in log space are better correlated to pereceived colour differences, (the logarithm function enforces Weber's law). Ultimately the objects discriminated in the experiments herein were coloured in such a way that look distinct and different to the eye, so matching should be perceptually relevant.

Funt et al, hitherto referred to, also used a variety of colour constancy algorithms, including max RGB, grey-world and a neural net method, as a pre-processing step in colour distribution based recognition. All methods tested performed significantly worse than the perfect colour constancy case. No algorithm delivered supported more than a 70% recognition rate.

Other colour invariant based methods, predicated on functions of many image pixels, have also been tried on the same data set. None delivered results better than the 96% recognition rate achieved with the present invention.

CONCLUSIONS

Colour constancy, in its most general form amounts to re-rendering a given RGB image so that it appears as if it were obtained using a known reference light. This problem has turned out to be very hard to solve so most modern algorithms attempt only to recover reference light chromaticities. This simpler 2-dimensional colour constancy problem though more tractable is only soluble given sufficient colour content in the scene. In this specification, it has been considered if a 1-dimensional colour constancy problem might be easier to solve. Specifically, there was sought a single image colour co-ordinate, a function of RGB, that might be easily mapped to the known reference conditions.

It has been shown that such a coordinate exists—namely a particular linear combination of log RGB responses, which has been shown to be invariant to light intensity and illuminating light colour. Moreover, by construction, the invariant co-ordinate under reference and all other lights remains unchanged so no colour constancy mapping is actually needed (the mapping is always the identity transform). The result rests on two assumptions: that camera sensitivities behave like Delta functions and illumination chromaticities fall near the Planckian locus. Many cameras have sensitivities which are sufficiently narrow that they behave as if they were equipped with Delta function sensitivities. When a camera has broad-band sensitivities, then a basis transform usually suffices to take camera measurements to a co-ordinate system where the Delta function assumption holds. The Inventors have yet to find a camera where the invariant calculation cannot be made.

Experiments show that invariant co-ordinate (coded as a grey-scale) histograms provide a stable cue for object recognition. Indeed, they support better indexing performance than chromaticity histograms created post-colour constancy processing.

The invention claimed is:

1. A method of processing an N-component color signal from a color signal source so as to eliminate dependency on color temperature and/or intensity variation by using a mathematical algorithm derived from the source sensitivities to different wavelengths of light in a signal processing computer supplied with the color signal, to provide new values for the components making-up the color signal which are independent of the color temperature of the light illuminating, or deemed to illuminate, the subject described by the color signal, wherein the N components, such as RGB signals of a 3 component color signal, define an image of an illuminated colored subject, the processing serving to produce modified signal components defining an image of the same subject as if illuminated under light of different color temperature, comprising the steps of:

(1) generating the N-(RGB etc.) components of a color signal corresponding to an illumination of the subject using illumination of color temperature $T_1$;

(2) forming the N log values (R' G' B' etc.) of the N-RGB etc. components of the color signal so obtained; and (3) computing the N log values (R*, G*, B* etc.) of the N-RGB etc. components of the color signal for a different illumination color temperature $T_2$ using the equation:

$$(R^*G^*B^* \ldots) = (R'G'B' \ldots) + X(u,v,w, \ldots)$$

where X is proportional to (T1–T2) and u, v, w, etc. are constants that depend only on the spectral sensitivities of the signal source and Planck's equation defining black body illumination.

2. A method as claimed in claim 1 further comprising the step of converting the log values (R*, G*, B*, . . . ) to N different signals, typically appropriate RGB etc. values, for processing and/or display and/or storing.

3. A method as claimed in claim 1 wherein the color signal is derived from a camera, multispectral imaging device, or a scanner, or is a computer generated signal.

4. A method as claimed in claim 1 in which the method is applied to the N-RGB etc. values of each pixel making up a multi-pixel image.

5. A corrected RGB signal when obtained by the method of claim 1, comprising three parts namely in which the two non-zero log values are independent of the illumination color temperature.

6. A corrected RGB signal when obtained by the method of claim 1, in the form of a vector (R*, G*, B*)−G*/v(u, v, w) which can be written in the form (χ, 0, γ) in which the non-zero components χ and γ are two values that are independent of the color temperature of the illuminant.

7. A method as claimed in claim 1, wherein the N values are normalized with respect to one of the N values to remove intensity dependence and reduce the number of values to (N−1).

8. A method as claimed in claim 7 wherein there are three components R G and B in the original signal and as a result of normalisation these are reduced in number to R/G and B/G, and color intensity independence is obtained by converting these two components, one to zero and the other to (B'−R' b/a) where B' is log B/G and R' is log R/G, and the values of a and b are derived from the values u, v, w for the signal source.

9. A method as claimed in claim 1, comprising the step of calibrating the source in advance to determine the (u, v, w etc. (or a, b, c etc.)) values for the source.

10. A computer when programmed so as to perform the method of claim 1.

11. A method as claimed in claim 1, further comprising the step of converting corrected component signal values as aforesaid into a grey scale or pseudo color signal for processing and/or comparison and/or storage and/or for forming a grey scale or pseudo color image in place of a true-color image in a display.

12. A method as claimed in claim 11 wherein a 1-dimensional color co-ordinate is expressed as a function of chromaticity, so as to remove dependence on the illumination color temperature by converting an 2 component color signal to a single component grey-scale signal or pseudo color signal, and a comparison is performed by the step of mapping the grey-scale values (or pseudo color values) to grey-scale values (or pseudo color values of a similar scene observed under reference lighting conditions.

13. A method of color-based object recognition employing color signals as processed and/or normalised as claimed in claim 11 wherein objects are represented by the distributions of invariant co-ordinates calculated from color images of the objects obtained by the processing to produce greyscale histograms (since the invariant co-ordinates are coded as grey-scale), and recognition is performed by distribution comparison whereby the distribution of an unknown object is compared with known object distributions stored in a database, and the closest match identifies the unknown object.

14. A method of image analysis comprising the steps of comparing illumination color temperature and/or intensity corrected signals obtained by the method of claim 1 or summations or other computational combinations of some or all of the intensity corrected signals, with stored values of such signals and/or similar summations or other computational combinations thereof, to permit object recognition.

15. A computer programmed to perform the comparison set forth in claim 14.

16. A method as claimed in claim 1 in which the source includes RGB etc. correction in each of the N channels for the N components to compensate for the expected non-linearity of a display device such as CRT based display or monitor to which the signal could be supplied, and a linear relationship between the N-component color signal and the resulting image is obtained by dividing the log camera responses by the average of the log color responses in a local neighbourhood of the pixel of interest in the image prior to calculating the invariant co-ordinates i.e. corrected component values.

17. A method as claimed in claim 1 in which after the invariant co-ordinate(s) is/are calculated, the value(s) is/are normalised by the average invariant co-ordinate in a local neighbourhood of a pixel of interest in the image.

18. A method of processing an N-component color signal (N>1) from a color signal source so as to eliminate dependency on color temperature and/or intensity variation by using a mathematical algorithm derived from the source sensitivities to different wavelengths of light in a signal processing computer supplied with the color signal, to provide new values for the components making up the color signal which are independent of the color temperature of the light illuminating, or deemed to illuminate, the subject described by the color signal, the method comprising the step of adjusting the N components of the signal so as to produce component values which when using an imaging means to image a colored subject are independent of the color temperature of the light illuminating the subject wherein the adjustment is effected by the step of computing for each of (N−1) components a new value using the original component value, the Nth component value, and an algorithm incorporating a mathematical operator whose value is related to the spectral sensitivity of the imaging means to different color temperature illuminants.

19. A method of processing an N-component color signal (N>1) as claimed in claim 18, wherein the N values are normalized with respect to one of the N values to remove intensity dependence and reduce the number of values to (N−1).

20. A method as claimed in claim 19, wherein there are three components R G and B in the original signal and as a result of normalization these are reduced in number to R/G and B/G, and color intensity independence is obtained by converting these two components, one to zero and the other to (B'−R'.b/a) where B' is log B/G and R' is log R/G, and the values of a and b are derived from the values u, v, w for the signal source.

21. A method of image enhancement when processing a color signal in a system in which the log of the color response is composed of three parts, a vector due to the intensity of the illumination, a vector due to the illumination color temperature, and a vector due to reflective properties of the surface illuminated for the purpose of producing the image, comprising the step of adjusting the magnitude of the intensity vector, or the magnitude of the illumination color temperature vector for each pixel so as to change the effective illumination for each pixel in a display of the image using the processed signal.

22. A method of enhancement as claimed in claim 21 further comprising the step of increasing or decreasing the color warmness or color depth by altering the magnitude of the illumination color temperature vector of the signal.

23. A method as claimed in claim 22 further comprising the step of altering the magnitude by scaling all illumination color temperature vectors for all pixels in the image.

24. A method as claimed in claim 22 further comprising the step of increasing or decreasing the magnitude of the illumination intensity vector for all pixels in an image so as to brighten or darken the overall picture, to allow enhancement of a final image without altering the original illumination.

25. A method as claimed in claim 22 wherein said step of adjusting the magnitude of the intensity vector is performed on a frame basis, or on selected regions of a frame made up of many pixels, or on a pixel by pixel basis.

26. A method of image enhancement applied to N-component color signal, such as the RGB signals of a 3 component color signal, defining an image of an illuminated colored subject, wherein the components are processed to produce modified signal components defining an image of the same subject as if illuminated by a different color temperature (T), comprising the steps of:
  (1) generating the N-(RGB etc.) components of a color signal corresponding to an illumination of the subject using illumination of color temperature T;
  (2) normalising the N components of the color signal with respect to one of the components (e.g. G) to provide (N−1) co-ordinates, such as R/G, B/G in a 3 component RGB signal, so that each of the resulting components is independent of illumination intensity,
  (3) computing the log values of these (N−1) co-ordinates, such that log(R/G)=R' and log (B/G)=B', in the case of an RGB signal, and
  (4) adjusting the values of R', B', etc., to produce new values R*, B*, etc., corresponding to the values which would apply if the color temperature of the illumination is $T_2$ using the equation (R*, B*, etc.)=(R', B', etc.)+ X(a, b, etc.) where X is proportional to $(T_1-T_2)$ and a and b etc. are constants that depend only on the spectral sensitivities of the source and Planack's equation defining black-body illumination.

27. A method as claimed in claim 26 further comprising the step of converting the values R*, B*, etc., to new RGB etc. values, and using the new values for processing and/or comparison and/or storage and/or display.

28. A method as claimed in claim 26, wherein said signal has a source and wherein said source is a camera, a multi-spectral imaging device, a scanner or a computer programmed to produce a color signal.

* * * * *